(12) United States Patent
Eldering

(10) Patent No.: US 8,335,854 B2
(45) Date of Patent: Dec. 18, 2012

(54) PERFORMING SERVICES ON BEHALF OF LOW-POWER DEVICES

(75) Inventor: Charles A. Eldering, Furlong, PA (US)

(73) Assignee: Empire Technology Development LLC, Wilmington, DE (US)

( * ) Notice: Subject to any disclaimer, the term of this patent is extended or adjusted under 35 U.S.C. 154(b) by 481 days.

(21) Appl. No.: 12/506,391

(22) Filed: Jul. 21, 2009

(65) Prior Publication Data

US 2011/0022977 A1    Jan. 27, 2011

(51) Int. Cl.
*G06F 15/16* (2006.01)
(52) U.S. Cl. ........ 709/229; 709/200; 709/203; 709/224; 370/352; 455/565; 358/1.15; 358/1.13; 711/6
(58) Field of Classification Search .................. 709/229
See application file for complete search history.

(56) References Cited

U.S. PATENT DOCUMENTS

| | | | |
|---|---|---|---|
| 6,496,893 B1 | 12/2002 | Arai | |
| 7,107,442 B2 * | 9/2006 | Cheshire | ........................... 713/1 |
| 2003/0005100 A1 | 1/2003 | Barnard et al. | |
| 2003/0184596 A1 | 10/2003 | Kodosky | |
| 2004/0153809 A1 | 8/2004 | Goto | |
| 2005/0068571 A1 | 3/2005 | Hart et al. | |
| 2006/0101109 A1* | 5/2006 | Nishio | ........................ 709/200 |
| 2007/0035410 A1 | 2/2007 | Cohen | |
| 2007/0043540 A1 | 2/2007 | Cleland et al. | |
| 2007/0214276 A1 | 9/2007 | Panabaker et al. | |
| 2008/0052386 A1 | 2/2008 | Johnson et al. | |
| 2008/0215796 A1 | 9/2008 | Lam | |
| 2008/0288661 A1 | 11/2008 | Galles | |
| 2009/0063663 A1 | 3/2009 | Ikeno | |
| 2009/0113423 A1 | 4/2009 | Hiltgen | |
| 2009/0182859 A1 | 7/2009 | Motoyama | |
| 2009/0225357 A1* | 9/2009 | Miyake et al. | ............... 358/1.15 |
| 2009/0292858 A1* | 11/2009 | Lambeth et al. | .................. 711/6 |
| 2011/0194134 A1* | 8/2011 | Miyamoto | ................... 358/1.13 |

OTHER PUBLICATIONS

"Universal Serial Bus Specification, Revision 2.0, Apr. 27, 2000 [retrieved on Oct. 25, 2010] This document can be viewed at the following url:http://pierrelib.pagesperso-orange.fr/buses/USB_2.O_Spec.pdf>".
National Instruments, Fieldbus NI-FBUS Communications Manager User Manual, Jul. 2000 [retreived on Oct. 25, 2010]. Retrieved from the Internet: <URL:http://www.ni.com/pdf/manuals/321287c.pdf> pp. 76,245.

(Continued)

*Primary Examiner* — Hua Fan
(74) *Attorney, Agent, or Firm* — Carlineo, Spicer & Kee, LLC

(57) ABSTRACT

Techniques are generally described that relate to a computer-implemented method of using a virtual device operating in a first computer network to perform a service on behalf of a low-power device operating in a second computer network includes receiving, by the virtual device, device data reports and a device descriptor from the low-power device. The virtual device may be adapted to store the device data reports and/or the device descriptor in computer-readable memory coupled to the virtual device. The virtual device may also be adapted to receive a low-power device service request from a requesting device operating in a third computer network and may determine that the device descriptor indicates that the low-power device is unavailable to respond to the low-power device service request. A response to the low-power device service request may be generated by the virtual device based on the device data reports.

15 Claims, 17 Drawing Sheets

OTHER PUBLICATIONS

Maaref et al, A Real-Time Control Operating System for Industrial Automatino, Dec. 1999 [retrieved on Oct. 25, 2010]. Retrieved from the Internet: <URL: http://www.omimo.be/magazine/99q4/imag.pdf>.

International Search Report by Lee W. Young for PCT/US2010/37176, mailed Nov. 12, 2010. 10 pages.

International Search Report by Lee W. Young for PCT/US2010/37178, mailed Nov. 4, 2010. 14 pages.

Mikhail Galeev, "Home networking with Zigbee," Embedded Systems Design. Downloaded on Jan. 13, 2009 from <http://www.embedded.com/columns/technicalinsights/18902431?_requestid=215764>.

Shoichi Sakane, Yosuke Ishii, Katsuhiko Toba, Ken'ichi Kamada and Nobuo Okabe, "A translation method between 802.15.4 nodes and IPv6 nodes," Proceedings of the International Symposium on Applications and the Internet Workshops, SAINT Workshops 2006, Jan. 23-27, 2006.

Reen-Cheng Wang, Ruay-Shiung Chang and Han-Chieh Chao, "Internetworking Between ZigBee/802.15.4 and IPv6/802.3 Network", Proceedings of ACM SIGCOMM 2007 Workshops, pp. 362-367, Kyoto, Japan, Aug. 27-31, 2007.

A. Brandt and G. Porcu, "Home Automation Routing Requirement in Low Power and Lossy Networks: draft-ietf-roll-home-routing-reqs-02," Jul. 14, 2008.

David Culler, "Secure, low-power, IP-based connectivity with IEEE 802.15.4 wireless networks," Industrial Embedded Systems, Jun. 2007.

"Routing Over Low power and Lossy networks (roll) Charter." Access on Jul., 2008 at <http://www.ietf.org/html.charters/roll-charter.html>.

* cited by examiner

| POWER DESCRIPTOR ||
|---|---|
| Current Power Mode | Powered periodically |
| Available Power Sources | Rechargeable battery (A)<br>Rechargeable battery (B) |
| Current Power Source | Rechargeable battery (A) |
| Current Power Source Level | 100% |

*Fig. 4*

PERFORMING SERVICES ON BEHALF OF LOW-POWER DEVICES

CROSS REFERENCE TO RELATED APPLICATION

This application is related to U.S. patent application Ser. No. 12/506,383, filed Jul. 21, 2009, and entitled Virtualization for Low-Power Devices.

BACKGROUND

This disclosure generally relates to device and network virtualization, and, more particularly, to providing enhanced functionality to low-power ("LP") devices operating in a network.

LP devices are typically designed to provide sensor and control functionality in a home or commercial setting. These devices generally communicate with one another through a wireless network to provide functionality such as home automation, security, and monitoring.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 is a diagram illustrating an example of a power descriptor file passed from an LP device computing system to a virtual device computing system;

DETAILED DESCRIPTION

Figure 1:
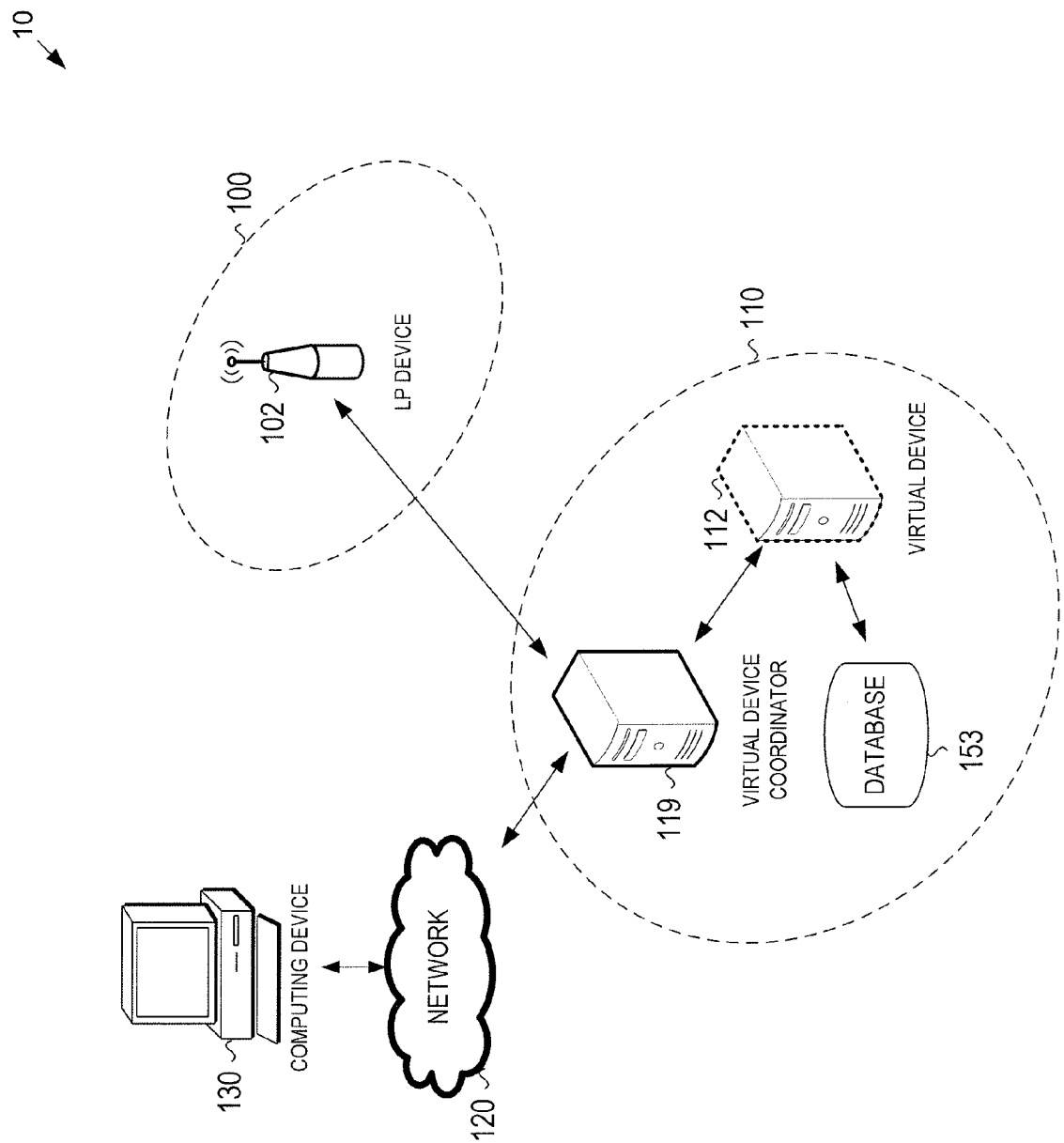
FIG. 1 is a system diagram illustrating an example of a virtual networking system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments.

This disclosure is drawn, inter alia, to methods, apparatuses, computer programs, and systems related to the virtualization of low-power ("LP") device networks through the implementation of virtual device computing systems. The term "computing system" as used herein, may generally refer to one or a plurality of computing devices, whether physical or virtual, coupled or interconnected via a network or other communication medium or protocol to facilitate communication within or among the device(s).

Briefly stated, the multiple embodiments of the present disclosure may include a virtual device computing system configured to support, emulate, and/or supplement the functionality of an associated LP device computing system through device virtualization. Device virtualization may generally refer to the use of one or more software modules to support, emulate, and supplement the functionality of an LP device. The software modules associated with a particular device may be collectively referred to as a "virtual device."

FIG. 1 is a system diagram illustrating an example of a virtual networking system 10, in accordance with at least some embodiments of the present disclosure. In FIG. 1, a virtual device computing system 110 may be configured to communicate with an LP device computing system 100 to receive descriptive information about an LP device 102. The virtual device computing system 110 may include a virtual device coordinator 119 that is adapted to interact with the LP device computing system 100. Based on the descriptive information received from the LP device 102, the virtual device coordinator 119 may create or configure a virtual device 112 to support, emulate, and supplement the functionality of the LP device 102. The virtual device 112 may be coupled to a database 153 which may allow the virtual device 112 to store, for example, data related to LP device 102. The virtual device computing system 110 and/or the virtual device coordinator 119 may also be coupled to a network 120 which may facilitate communications with a computing device 130 operating outside the LP device computing system 100. Thus, through the network 120, the computing device 130 may send requests and receive information regarding the LP device 102 through interaction with the virtual device 112 via communication with the virtual device coordinator 119.

LP devices, such as LP device 102 in FIG. 1, may be devices, systems, apparatuses, or appliances that may be configured to communicate (e.g., via a low-power digital radio) over a wireless personal area network (PAN). LP devices may be adapted to provide sensor and control functionality in home and commercial settings. Examples of LP devices may include, without limitation, lighting control modules, temperature sensor modules, temperature control units, energy monitors, water sensors, smoke and fire detectors, motion detectors, video surveillance units, and advanced remote controls.

LP devices may be distinguished from other wireless networking technology by characteristics such as relatively low power consumption and low transmission latency. With respect to power consumption, LP devices may rely on battery power. As a result, LP devices may be configured to maximize battery life by operating with minimal power and entering a "sleep" mode when not active. To further limit power consumption and reduce the cost of individual devices, LP device standards may set an approximate upper limit on the bandwidth that an LP device can support. For example, the "ZigBee" standard limits bandwidth to approximately 250 kbps. Regarding transmission latency, LP devices may be designed to approximately minimize the time needed to transmit messages between LP devices. Given the limits on bandwidth and the goal of minimizing latency, LP devices may be constrained in the amount of data that they can transfer. Consequently, the size of messages used to communicate between LP devices may be small relative to other wireless technologies such as Wi-Fi and WiMax.

Still referring to FIG. 1, the LP device 102 in the LP device computing system 100 may be adapted to communicate with the virtual device coordinator 119 to send and receive information relevant to LP device operation. The virtual device coordinator 119 may be a combination of hardware and software configured to create and manage the virtual device computing system 110 based on the information (e.g., descriptor files) received from the LP device computing system 100. In some embodiments, the virtual device coordinator 119 may comprise one or more of virtual device coordinator software, computer-readable memory, one or more network connections, one or more processing units, and/or a database. The computing resources allotted to the virtual device coordinator 119 may be utilized exclusively by the virtual device coordinator 119 or the resources may be shared in a multi-process computing environment. In some embodiments, the virtual device 112 may be included in the virtual device computing system 110 may execute on the same computer as the virtual device coordinator 119. In other embodiments, execution of the virtual device 112 and the virtual device coordinator may be split across two or more computers.

In some embodiments, the virtual device coordinator 119 may use the descriptor files received from the LP device computing system 100 to create one or more software modules to support, emulate, and/or supplement the functionality available at the LP device 102. The software modules that are associated with an individual LP device may be collectively referred to as a "virtual device." Thus, for example, if the LP device 102 is a temperature sensor, the virtual device 112 may be a virtual temperature sensor. The virtual device 112 may be designed to operate in hardware environments that may provide enhanced functionality over the hardware limitations presented by the LP device architecture. For example, the virtual device 112 may have access to a much larger storage area (e.g., the database 153 of FIG. 1) than the LP device 102 and sources of power that may allow the virtual device 112 to operate substantially continuously. In addition, the virtual device 112 may be adapted to leverage software and hardware standards for security, authentication, translation, configuration, and management implemented by protocols that cannot be conveniently used on the LP device 102.

Still referring to FIG. 1, the LP device 102 may, for example, be a temperature sensor module. Such a device may be configured to determine temperature measurements at regular intervals and communicate those measurements with other LP devices (not shown in FIG. 1) via the LP device computing system 100. Other functionality, such as maintaining records of past temperature measurement, may not be available from the LP device 102. To provide such functionality, the virtual device coordinator 119 may be configured to determine the operational characteristics of the LP device 102 and may configure virtual device 112 to support, emulate, and/or supplement those characteristics. The virtual device 112 may, for example, be configured to record measurements from the LP device 102 in a database 113 that may be coupled to the virtual device 112. Thus, the computing device 130 that is external to the LP device computing system 100, may be adapted to communicate with the virtual device computing system 110 (e.g., via the virtual device coordinator 119) to receive a record of past temperature measurements by the temperature sensor module 102. As described in greater detail below, it should be understood that the virtual device computing system 110 may be configured to facilitate interaction and communication between multiple virtual devices (not shown in FIG. 1), coordinated by the virtual device coordinator 119.

Figure 2:
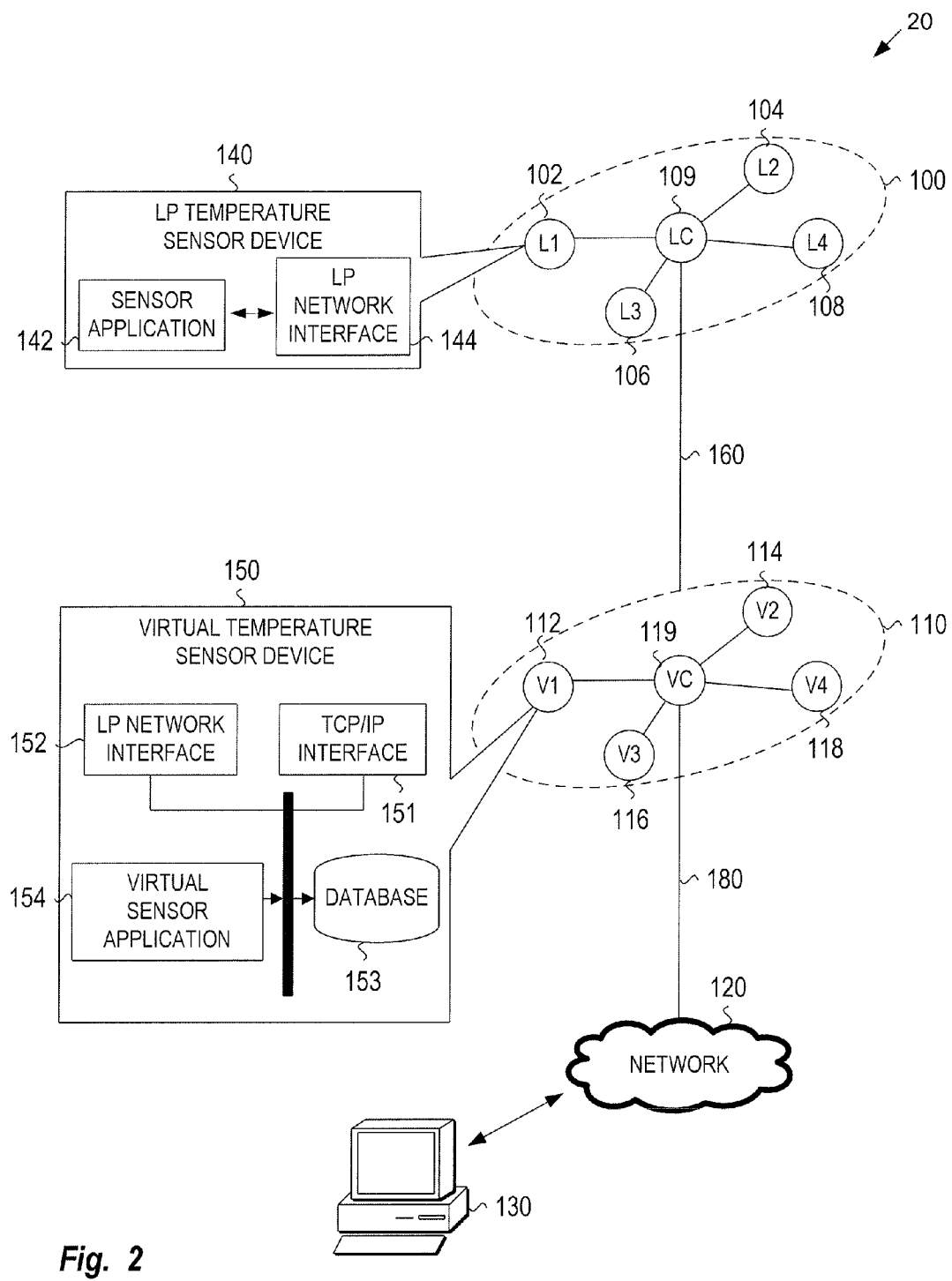
FIG. 2 is a system diagram illustrating an example of a virtual networking system.

FIG. 2 is a system diagram illustrating an example of a virtual networking system 20, in accordance with at least some embodiments of the present disclosure. The virtual networking system 20 of FIG. 2 comprises multiple virtual devices that may support, emulate, and/or supplement the functionality of multiple LP devices. In FIG. 2, the virtual networking system 20 may include an LP device computing system 100 comprising one or more LP devices 102, 104, 106, and 108 (labeled "L1", "L2, "L3", and "L4", respectively) and an LP device coordinator 109 (labeled "LC"). The virtual networking system 20 may also include a virtual device computing system 110 comprising one or more the virtual devices 112, 114, 116, and 118 (labeled "V1", "V2, "V3", and "V4", respectively) and a virtual device coordinator 119 (labeled "VC"). The LP devices 102, 104, 106, and 108 may be arranged to communicate with each other in the LP device computing system 100 using any wireless protocol generally known in the art, including network protocols specifically designed for LP device communication. For example, in ZigBee networks, LP devices may communicate using the IEEE 802.15.4 wireless protocol. In some network configurations, the LP device coordinator 109 may be arranged to maintain network knowledge and facilitate communication between the LP devices 102, 104, 106, and 108. In some embodiments, the functionality of the LP device coordinator 109 may be included in an LP device. In the ZigBee networks, for example, any LP device may operate as an LP device coordinator. Thus, in some embodiments, the LP device coordinator 119 is also an LP device.

In the example of FIG. 2, the LP device 102 may be an LP temperature sensor device 140 comprising a sensor application 142 that communicates with the LP device computing system 100 via an LP network interface 144. Through the LP network interface 144, the LP device 102 may be arranged to send descriptor files to the LP devices 104, 106, 108, and 109, indicating that the temperature sensor application 142 is executing on LP device 102. The descriptor files may be further relayed from the LP device computing system 100 to the virtual device computing system 110 through a communication link 160 between the two computing systems 100, 110. Based on the information included in the descriptor files, the virtual device coordinator 119 may configure the virtual device 112 to support, emulate, and supplement the functionality available at the LP device 102.

Still referring to FIG. 2, the virtual device 112 may be configured to support, emulate, and/or supplement the LP device 102 via a virtual temperature sensor device 150. The virtual temperature sensor device 150 may include a virtual sensor application 154 running on the virtual device 112 that is associated with sensor application 142 running on the LP device 102. The virtual sensor application 154 may be configured to perform a variety of functions including, without limitation, recording LP device 102 state information, providing historical analysis and future projections of temperature data, as well as manipulation and conversion of temperature data. A database 153 associated with the virtual temperature sensor device 112 may be arranged to store information gathered and generated by the virtual sensor application 154. The virtual temperature sensor device 150 may also include a TCP/IP interface 151 for connecting to other devices via TCP/IP connection. For example, data may be communicated over a network connection 180 (discussed in greater detail below) which may be TCP/IP to computing device 130 via the network 120. Similarly, the virtual temperature sensor device 150 may include an LP network interface 152 for interfacing directly with the LP device computing system 100.

In some embodiments, the virtual devices 112, 114, 116, and 118 may be implemented on or by one or more physical computing devices. In other embodiments, multiple virtual devices are implemented on a single physical computing device. Thus, virtual machines may share hardware architecture including, for example, a processor, one or more hard drives, and/or network connections. Moreover, the implementation of some or all of the virtual devices 112, 114, 116, and 118 on computing devices may be based on their functional requirements. For example, in a virtual network having multiple types of virtual devices (e.g., one type requiring a great deal of storage while the other type stores a small amount of data), execution of the different types of virtual devices may be split across multiple physical computers in groups that approximately maximize memory usage on any particular physical computer.

In some embodiments, the virtual devices 112, 114, 116, and 118 may execute in a virtual machine operating on a computer. Virtual machines may provide a complete system platform that may support, for example, a fully functioning operating system. Commercial software such as VMware, Microsoft Virtual PC, and Parallels may be used to host each hardware virtual machine. An advantage of virtual machines is that multiple operating system environments may exist on a single computer in strong isolation from one another. Thus, in one embodiment, multiple virtual devices may run in multiple virtual machines on a single computer. This may allow the virtual machines to share, for example, the available memory of the computer and its network connections without conflict. In other embodiments, virtual machines may be distributed across multiple computers to support multiple virtual computing system configurations. Thus, the computing resources of the virtual computing system 110 may scale along with those of its associated LP device computing system 100.

In some embodiments, there may be a one-to-one correspondence between virtual devices and LP devices. For example, with reference to FIG. 2, the virtual devices 112, 114, 116, and 118 may be associated with LP devices 102, 104, 106, and 108, respectively. In addition, the virtual device coordinator 119 may be associated with LP device coordinator 119. In other embodiments, one virtual device may support, emulate, and/or supplement the functionality available at multiple LP devices. The correspondence between the number of LP devices and the number of virtual devices may be selected based on factors such as the complexity of the LP computing system, the computational resources available to the virtual devices, or the preference of an administrator managing the virtual network. Where multiple LP devices are associated with a single virtual device, the virtual device may be adapted to use identifiers provided by the LP devices to distinguish between the LP devices.

Still referring to FIG. 2, the virtual device computing system 110 may be coupled to the LP device computing system 100 through at least one network connection. As shown in FIG. 2, there may be a single network connection 160 between the LP device coordinator 109 and the virtual device coordinator 119. In other embodiments (shown in FIGS. 3 and 4, for example), the connection between the LP device computing system 100 and the virtual device computing system 110 may be between any combination of the LP devices 102, 104, 106, 108, LP device coordinator 109, virtual devices 112, 114, 116, 118 and virtual device coordinator 119. In some embodiments, the network connection 160 may be implemented using the same networking protocol used by the LP devices. For example, if the LP devices operate in an IEEE 802.15.4-2006 low-rate wireless personal area network, the network connection 160 would support the IEEE 802.15.4-2006 standard. Translation functionality may be implemented in the virtual device coordinator 119 or at the virtual devices 112, 114, 116, and 118 to format data into a format compatible with the virtual device computing system 110. To provide a robust interface, translation functionality may be provided to handle various LP packet formats. For example, the interface 152 may have functionality to process data formatted according to the LP device specifications such as ZigBee, WirelessHART, and MiWi.

In FIG. 2, the computing device 130 is shown in communication with the virtual device coordinator 119 via the network 120. The network 120 may be any network or system generally known in the art, including the Internet, an intranet, a local area network (LAN), a wide area network (WAN), a metropolitan area network (MAN), a direct connection or series of connections, a cable television infrastructure, a cellular telephone network or any other network, transmission channel or medium capable of facilitating communication between the devices, modules and other components of the virtual networking system 10. The network 120 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, Bluetooth, infrared, cellular networks, satellite or any other wireless connection methodology generally known in the art. The network 120 may be implemented in a client-server, token-ring, peer-to-peer manner or any other network topology known in the art. Additionally, several networks may work alone or in communication with each other to facilitate communication in the network 120. Various networking standard protocols may be employed for facilitating various devices and other networks to communicate with the network 120, such as EDGE, 3G and/or IEEE 802.11 standard communication protocols.

The network connections associated with the virtual device computing system 110 may be configured in any number of ways, depending on the available computing and networking resources, as well as, the operational needs of devices in the LP device computing system 100. If information is required from the LP device associated with a particular virtual device, the virtual device may send a request through the device coordinators 109, 119. For example, the virtual device 112 may request data from LP device 102 by sending a request to virtual device coordinator 119. The virtual device coordinator 119 may be arranged to send the request to LP device coordinator 109, which in turn may relay the request to LP device 102. The LP device 102 may respond to the virtual device 112 via a reverse communication path.

Any device generally capable of sending and receiving data through the network 130 may be configured to communicate with the virtual device computing system 110. For example, with reference to FIG. 2, the computing device 130 may be configured to communicate with the virtual device coordinator 119 through the network 120 and network connection 180. Computing device 130 may generally be any device capable of communicating the with virtual device computing system 110 and operating outside of both (i.e., not included in either of) the LP and virtual computing systems 100, 110. Examples of suitable devices include, without limitation, Personal Digital Assistants (PDA), cell phones (including smart phones), personal computers (PCs), and video game systems.

The LP devices 102, 104, 106, and 108 may be discovered by issuing a device discovery request from the LP device coordinator 109 (discussed in greater detail below) with a broadcast or unicast address. Similarly, a service discovery request (discussed in greater detail below) may be sent to one or more of the LP devices 102, 104, 106, and 108 from the LP device coordinator 109 to determine what services are available on the device. An LP device may respond to a device or service discovery request by sending one or more descriptor files to the device that issued the request. In addition, there may be different types of descriptor files and each type provides different information regarding the LP device. For example, in ZigBee a device can be described in one of five descriptor file types: node descriptor, node, power descriptor, simple descriptor, complex descriptor.

Figure 3:
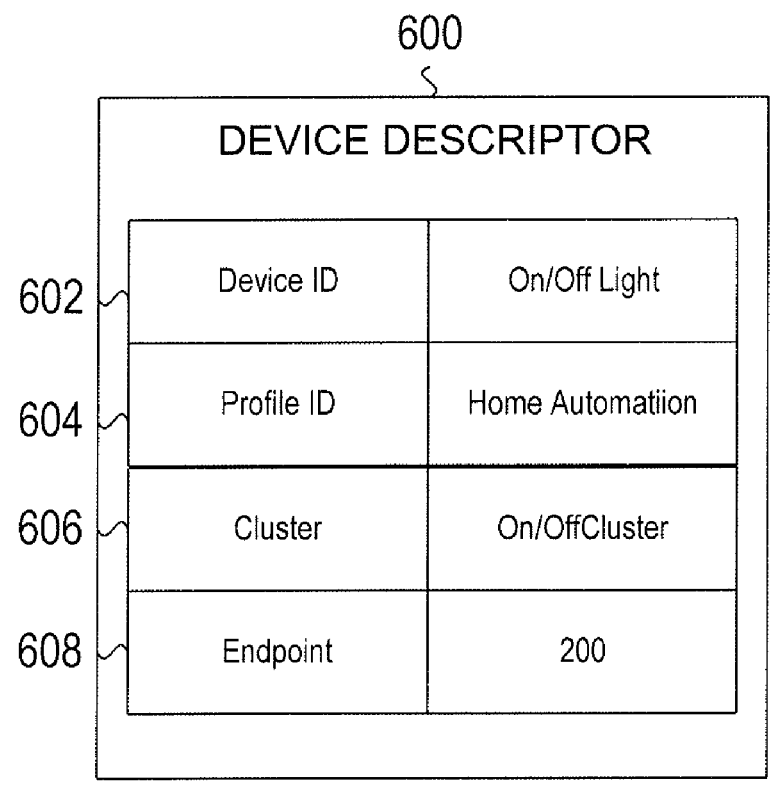
FIG. 3 is a diagram illustrating an example of a device descriptor file passed from an LP device computing system to a virtual device computing system.

FIG. 3 is a diagram illustrating an example of a device descriptor file 600 passed from an LP device computing system 100 to a virtual device computing system 110, in accordance with at least some embodiments of the present disclosure. An LP device may send the device descriptor file 600 in response to a device discovery request. Although the format of the file 600 shown in FIG. 3 is similar to that used by ZigBee protocol, any file format may be used. In the example of FIG. 3, the LP device associated with the file 600 is an LP lamp device (not shown). The example device descriptor 600 may include a device identifier 602 that indicates that the nature of the LP device (i.e., the LP device is a light that may be turned on or off). A profile identifier 604 may indicate that the LP lamp device is categorized as a home automation device. The profile identifier 604 may be used, for example, to decide how to exchange information with the LP device. A cluster value 606 may identify command types that may be sent to the LP device and attributes of the device that may be accessed by computing devices. The cluster value may also used to refer to a group of low-power devices. For example, if several lamps belong to the same cluster, they may all be turned off through interaction with the cluster rather than the individual devices. In the example of FIG. 3, the LP lamp device can receive an "on" or "off" command. The cluster identifier 606 may also be used to determine what type of responses to expect from the lamp. An endpoint field 608 may be employed to provide a unique identifier for the LP lamp device. It should be noted that, in some embodiments, other forms of descriptive information are also sent from an LP device as part of the device descriptor 600. For example, LP devices may be configured to share information such as their manufacturer, model name, and serial number. In addition, one or more of the fields 602, 604, 606, and/or 608 described with respect to FIG. 3, may not be present the device descriptor file 600 sent by the LP lamp device.

FIG. 4 is a diagram illustrating an example of a power descriptor file 700 passed from an LP device computing system 100 to a virtual device computing system 110, in accordance with at least some embodiments of the present disclosure. The power descriptor file 700 of FIG. 4 corresponds to the device descriptor file 600 of FIG. 3. An LP device may send the power descriptor file 700 in response to a device discovery request. The power descriptor file 700 may include, for example, an available power sources field 704 and a current power source field 706 to denote (in this example) that the current power source used to power the LP lamp device is rechargeable battery A and that rechargeable battery B is also available to power the LP lamp device. In addition, a power source level field 708 may indicate that the rechargeable battery A is fully charged. A current power mode field 702 may indicate how the LP device is currently configured to operate. In this example, the LP device may be configured to be powered periodically. In addition, one or more of the fields 702, 704, 706, and 708 described with respect to FIG. 4, may not be present the power descriptor file 700 sent by the LP lamp device.

Figure 5:
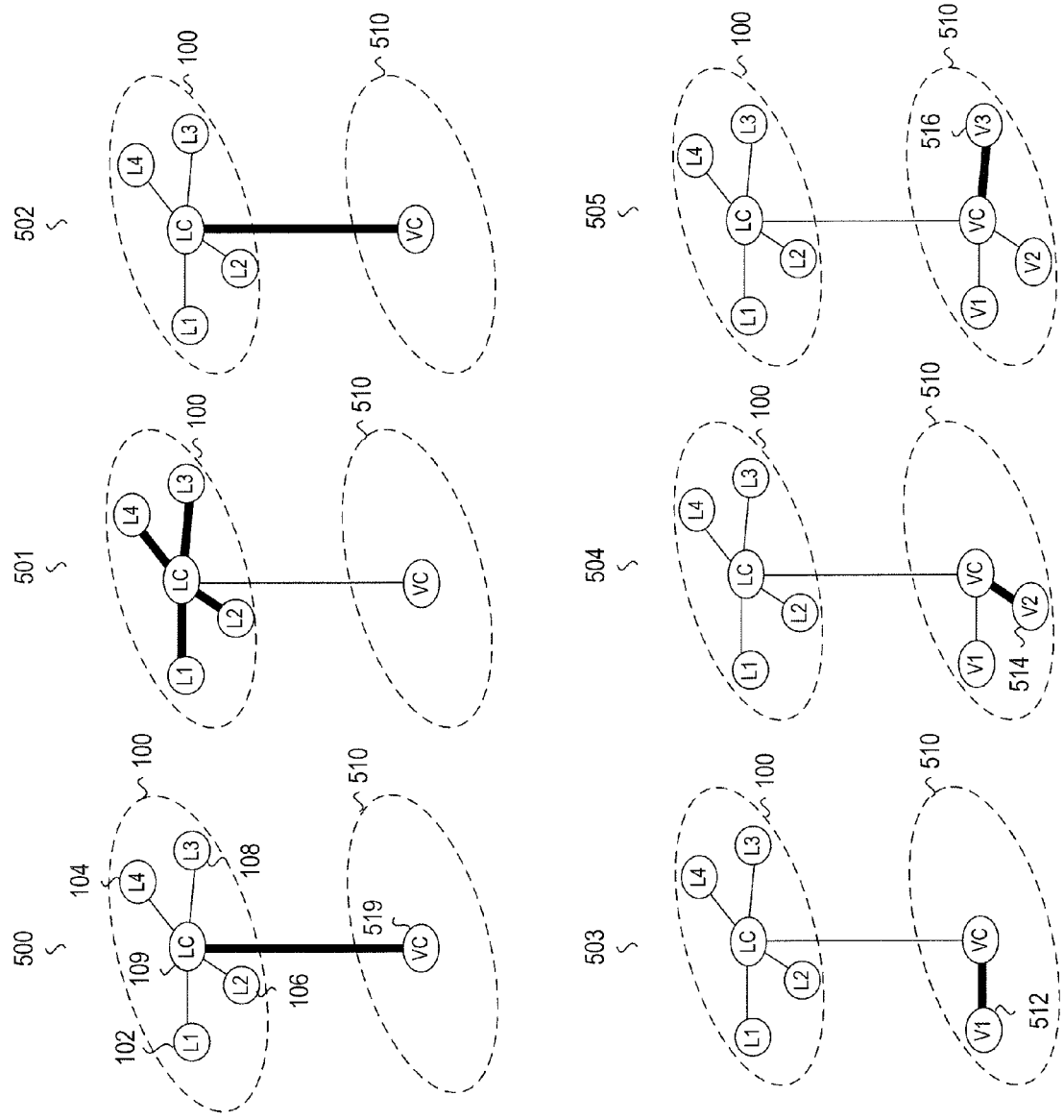
FIG. 5 is a system diagram illustrating an example of a process of creating a virtual device network for an LP network.

FIG. 5 is a system diagram illustrating an example of a process of creating a virtual device network for an LP network, in accordance with at least some embodiments of the present disclosure. In the example of FIG. 5, there are four LP devices 102, 104, 106, and 108 (labeled "L1", "L2, "L3", and "L4", respectively) in the LP device computing system 100 (e.g., a temperature sensor, a smoke detector, and two lamps). Example device types are provided in key 506. There is also an LP coordinator device 109 that may be adapted to coordinate the LP devices 102, 104, 106, and 108 in the LP device computing system 100. In the initial operation 500, the virtual device coordinator 519 in the virtual device computing system 110 may be adapted to initiate the virtual network creation process by sending a service discovery request to the LP device coordinator 109. In step 501, the LP device coordinator 109 may be adapted to send a service discovery request to the LP devices 102, 104, 106, and 108 in the LP device computing system 100. The LP devices 102, 104, 106, and 108 may reply by configured to send one or more descriptor files to the LP device coordinator 109. For devices that are currently unavailable, the LP device coordinator 109 may generate descriptor files for the unavailable device using the last known configuration. This may occur, for example, when the device is powered off at the time when the service discovery request is issued. In step 502, the LP device coordinator 109 may be arranged to send the descriptor files to the virtual device coordinator 519. Once the descriptor files are received by the virtual device coordinator 519, the information included in the files may be parsed to determine, for example, how many LP devices exist in the LP computing system 100, what applications exist for those devices, and the power characteristics of those devices. Based on this information, virtual devices may be created in steps 503, 504, and 505. For example, in step 503, the virtual device coordinator 519 may be arranged to create virtual device V1 512 based on the information provided about the LP temperature sensor device 102 operating in the LP computing system 100. Similarly, virtual device V2 514 may be created in step 504 based on the information gathered about the LP smoke detector device 106.

In the example of FIG. 5 a virtual device may also be created and configured to support, emulate, and/or supplement multiple LP devices. For example, at step 505, virtual device V3 516 may be created based on the information provided about the two lamps 104, 108 operating in the LP device computing system 100. Thus, in this example, the virtual device coordinator 519 may determine that a single virtual device 516 may efficiently support both LP devices 104, 108. For example, both lamps 104, 108 may be configured to accept the same commands and require minimal power to operate. Thus, for efficiency, two applications may be created and message generation functionality may be shared. A unique identifier provided in the endpoint field 708 of the device descriptor file 600 (e.g., see FIG. 3) may be used to distinguish two applications associated with the different LP devices 104, 108 running on a single virtual device 516.

Figure 6:
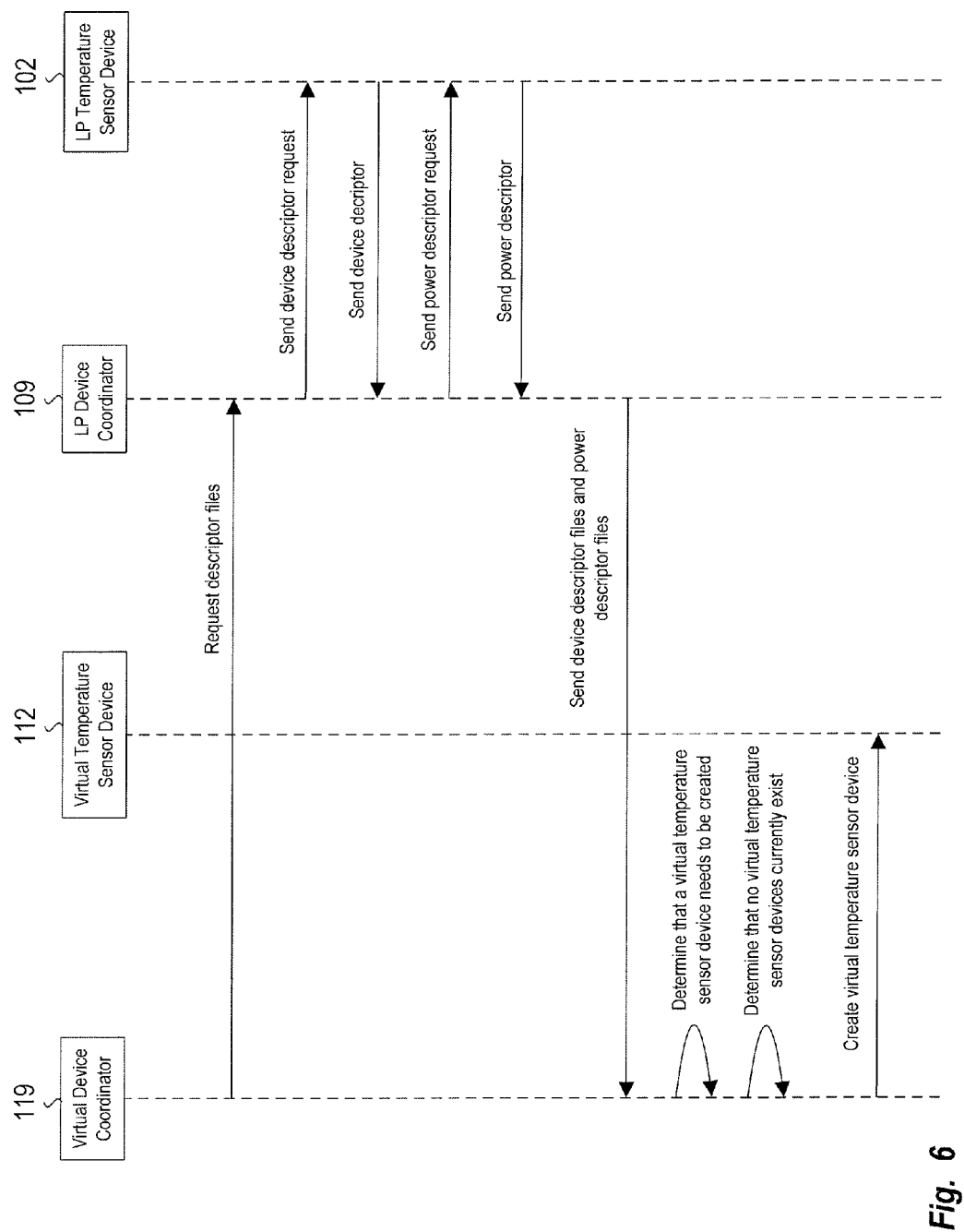
FIG. 6 is a sequence diagram illustrating an example process for creating a virtual device and application based on information provided by an LP device.

FIG. 6 is a sequence diagram illustrating an example process for creating a virtual device and application based on information provided by an LP device, in accordance with at least some embodiments of the present disclosure. The virtual device coordinator 119 may be arranged to send a request to the LP device coordinator 109 for descriptor files that may describe characteristics of LP devices in the LP device computing system 100. The LP device coordinator 109 may be configured to send device descriptor requests and/or power descriptor requests to the LP temperature sensor device 102. In response, the LP temperature sensor device 102 may send device and power descriptor files to the LP device coordinator 109, which then may relay the files to the virtual device coordinator 119. Based on the received information, the virtual device coordinator 119 may determine that a virtual temperature sensor device 112 should be created. The virtual device coordinator 119 may determine that no virtual temperature sensor devices currently exist, and then may create such a device. Optionally, the virtual device coordinator 119 may assign a unique identifier to one or more software modules executing on the virtual temperature sensor device to indicate an association for LP temperature sensor device 102.

In some embodiments, virtual devices may be created based on a request for LP device data. Thus, virtual devices may be created on an "as-needed" basis, thereby potentially saving resources on the computer(s) hosting the virtual devices.

Figure 7:
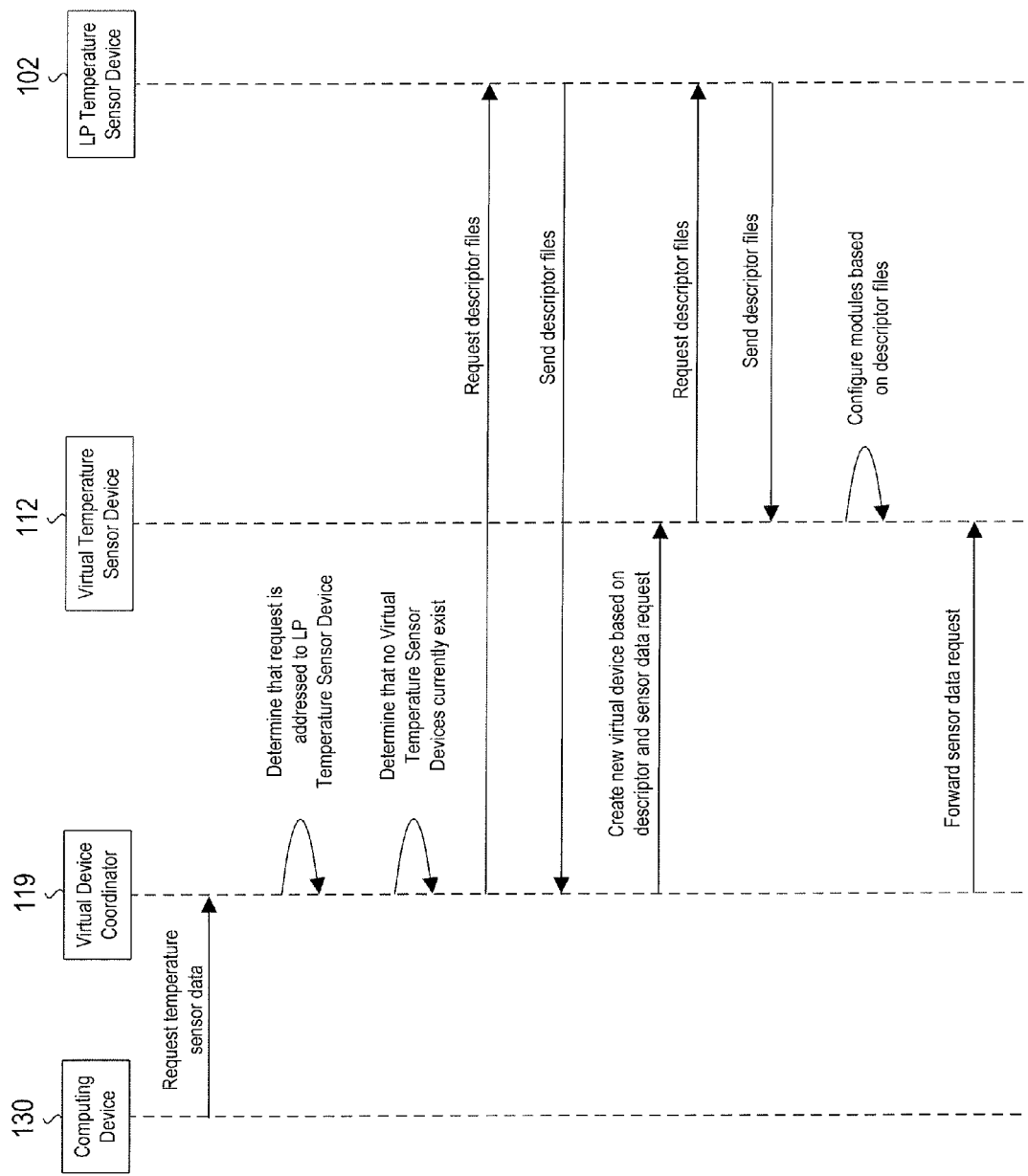
FIG. 7 is a sequence diagram illustrating an example process for dynamically creating a virtual device based on a request from a computing device.

FIG. 7 is a sequence diagram illustrating an example process for dynamically creating a virtual device based on a request from a computing device, in accordance with at least some embodiments of the present disclosure. In FIG. 7, the virtual device coordinator 119 receives a request for temperature sensor data from a computing device 130 that may be located outside of the LP device computing system 100. The virtual device coordinator 119 may be configured to determine that the request is addressed to LP temperature sensor device 102. This determination may be made, for example, by examining a destination value in the sensor request from the computing device 130. The virtual device coordinator 119 may be adapted to evaluate the virtual device computing system 110 to determine whether there is a virtual device that can handle the temperature sensor request. If no such device exists, the virtual device coordinator 119 may contact the LP temperature sensor device 102, either directly or though an LP coordinator 109 (not shown, see FIG. 2), to retrieve device descriptor data from an appropriate LP device 102. The device descriptor data may be used by the virtual device coordinator 119 to create a virtual temperature sensor device 112. The virtual device coordinator 119 may be arranged to create a virtual temperature sensor device 112 that is configured to support, emulate, and/or supplement the LP temperature sensor device 102 or, alternatively, the virtual device coordinator 119 may be arranged to create a generic virtual device that may provide minimal functionality generally required by virtual devices. In the example of FIG. 7, a virtual temperature sensor device 112 may be created. To configure the virtual temperature sensor device 112 to support LP temperature sensor device 102, the virtual temperature sensor device may be adapted to communicate with the LP temperature sensor device 102 to receive descriptor file and determine the functional characteristics of the LP temperature sensor device 102. Based on these descriptor files, the virtual temperature sensor device 112 may configure one or more of its constituent software modules to support, emulate, or supplement the LP applications. The virtual device coordinator 119 may be arranged to forward the sensor data request to the created virtual temperature sensor device 112.

In some embodiments, once a virtual device is created, the virtual device may continue to communicate with its associated LP device(s) and the LP device coordinator to maintain information about the operational state of the associated LP devices. For example, a virtual device may be configured to repeatedly request descriptor files from either the virtual device coordinator or the associated LP device(s). This information may indicate, for example, whether the device is on or off, whether the device is currently running on critical power, or whether the device is fully charged. This information may be used by the virtual device to maintain an operational state associated with the LP device. For example, when a virtual device receives a request for temperature data, the virtual device may check an LP temperature sensor device's operational state. If the virtual device determines that the LP device is currently powered off, the virtual device may respond to the request with data stored on the virtual device.

In some embodiments, rather than having each virtual device maintain LP device operational state information, the virtual device coordinator may be configured to maintain the operational state of one or more LP device(s) in the LP device computing system. The information may be gathered, for example, through communication with the LP device coordinator or through direct communication with the one or more LP device(s) in the LP device computing system. Virtual devices in the virtual device computing system may be configured to retrieve operational state information from the virtual device coordinator.

In some embodiments, virtual devices may be configured to support an LP device classification. Thus, LP devices that are classified similarly may be supported by the same virtual device. A classification may be determined for each LP device in an LP computing system based on the descriptor information provided by the LP device in descriptor files. Classifications may be developed based on one or more device characteristics. In some embodiments, devices from a manufacturer may be associated with a single virtual device. In other embodiments, the classification may be indicative of the functionality available on the device. Examples of this type of classification include, without limitation, home automation functionality, telecommunication functionality, mobile service functionality, industrial management functionality, multimedia control functionality, lighting control functionality, energy control functionality, and temperature control functionality. For example, referring again to FIG. 3, the device descriptor file 700 may be used to classify LP device 102 as providing home automation functionality based on the profile identifier value 704 in the device descriptor file 700. Devices may also be classified, for example, by operational characteristics such as power usage and inclusion in a device cluster.

Figure 8:
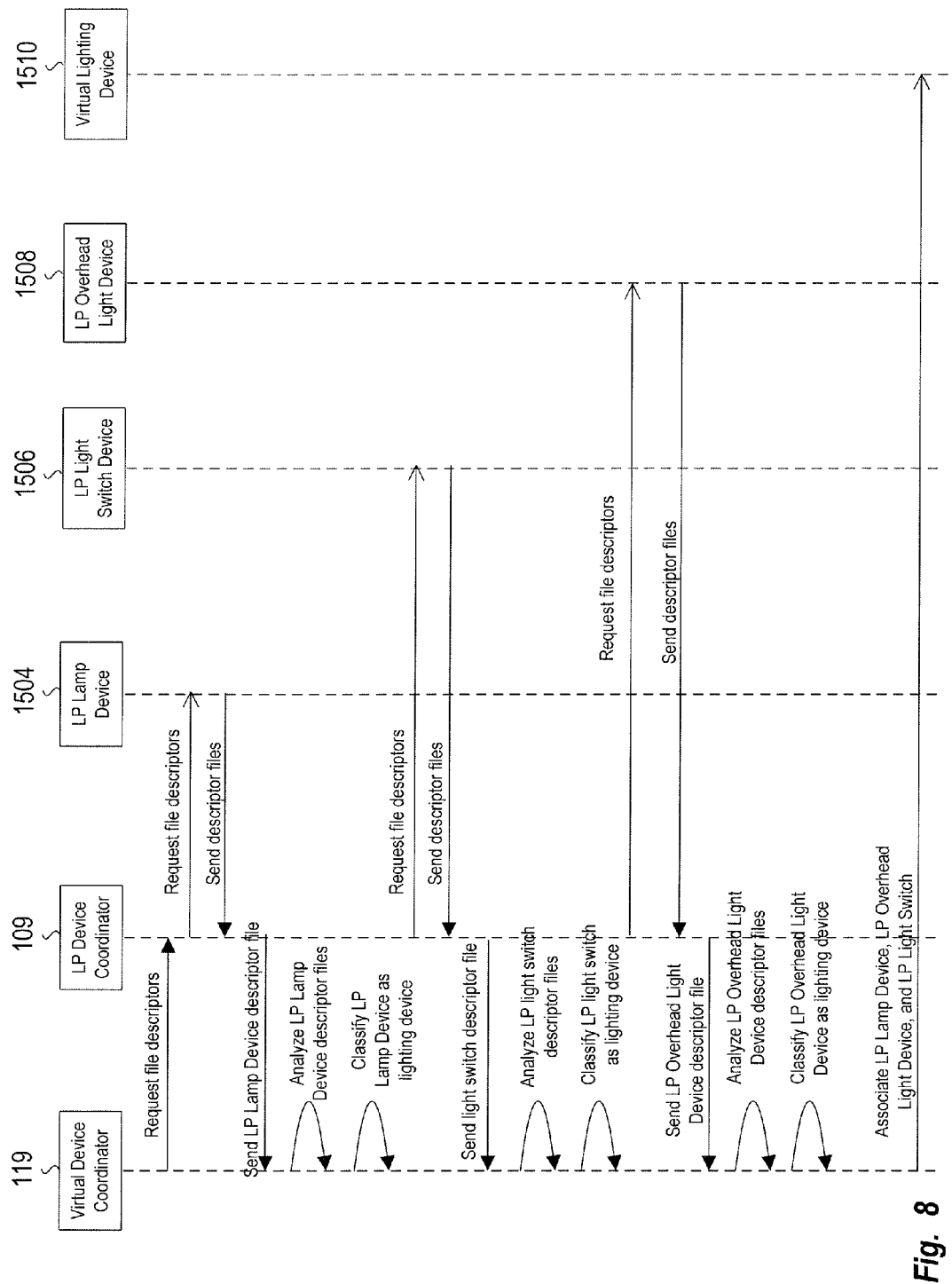
FIG. 8 is a sequence diagram illustrating an example process for creating virtual device sets based on information provided by a plurality of virtual devices.

FIG. 8 is a sequence diagram illustrating an example process for creating virtual device sets based on information provided by a plurality of virtual devices, in accordance with at least some embodiments of the present disclosure. In the example of FIG. 8, the virtual device coordinator 119 may be arranged to request file descriptors from the LP device coordinator 109. In some embodiments the request may be sent directly to the corresponding LP devices. In the example of FIG. 8 the LP device coordinator 109 may be configured to issue a series of discovery requests to an LP lamp device 1504, an LP light switch device 1506, and/or an LP overhead light device 1508. Each LP device 1504, 1506, or 1508 may be configured to respond by sending one or more descriptor files to the LP device coordinator 109. As the LP device coordinator 109 receives responses the from the LP devices 1504, 1506, or 1508, the response may be sent to the virtual device coordinator 119. As the virtual device coordinator 119 receives each descriptor file, it may analyze the information in the file and determine a classification. In this case, all three devices 1504, 1506, and 1508 may be classified by the virtual device coordinator 119 as lighting devices. Each LP device 1504, 1506, and/or 1508 may be associated with a virtual lighting device 1510.

In some embodiments, the virtual computing system 110 may disassociate LP devices from virtual devices over time if, for example, the LP device is determined to be unresponsive.

Figure 9:
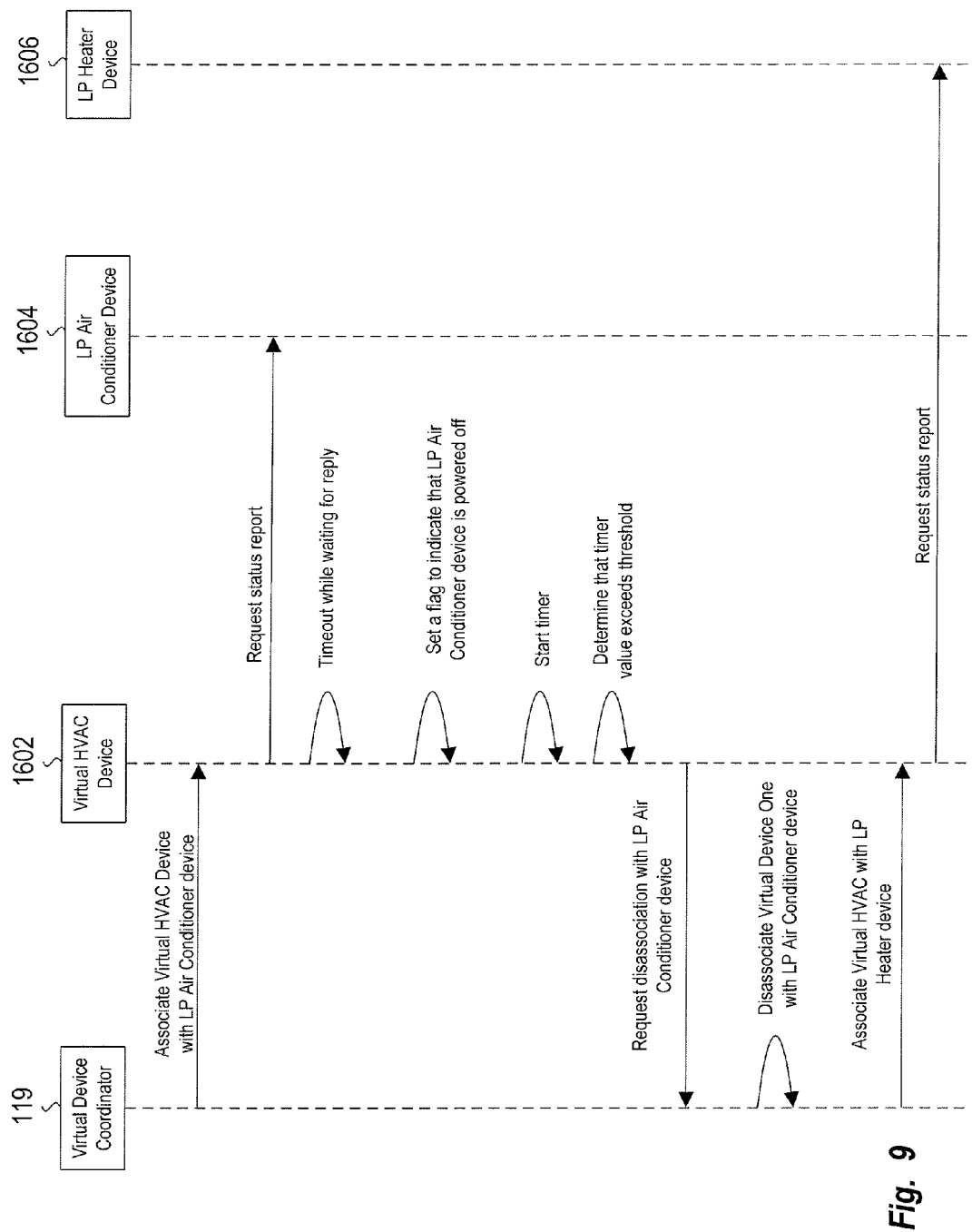
FIG. 9 is a sequence diagram illustrating an example process for disassociating a virtual device from an LP device.

FIG. 9 is a sequence diagram illustrating an example process for dissociating a virtual device from an LP device, in accordance with at least some embodiments of the present disclosure. In the example of FIG. 9, the virtual device coordinator 119 may initially associate a virtual HVAC device 1602 with an LP air conditioner device 1604. Over time, the virtual device 1602 may request status reports from the LP air conditioner device 1604. If virtual device 1602 does not receive a reply from the LP air conditioner device 1604, a timeout may occur, prompting the virtual device 1602 to set a flag that indicates that the LP air conditioner device 1604 appears to be powered off. A timer may be started and, once the timer is determined to exceed a threshold value, the virtual device 1602 may request disassociation from the LP air conditioner device 1604. It should be noted that the virtual HVAC device 1602 may set the threshold to any desired value. In some embodiments, the threshold value may be set based on the power characteristics of the device. For example, an LP device that is expected to be powered on continuously may have a threshold value of several seconds, while an LP device powered occasionally may have a threshold value of several hours. Once the virtual LP device 1602 has been disassociated from the air conditioner LP device 1604, the virtual device's 1602 resources may be reallocated to a new LP device. In the example of FIG. 9, following disassociation of the virtual device 1602 with the air conditioner LP device 1604, the virtual device coordinator 119 may associate the virtual HVAC device 1602 with an LP Heater device 1606.

Figure 10:
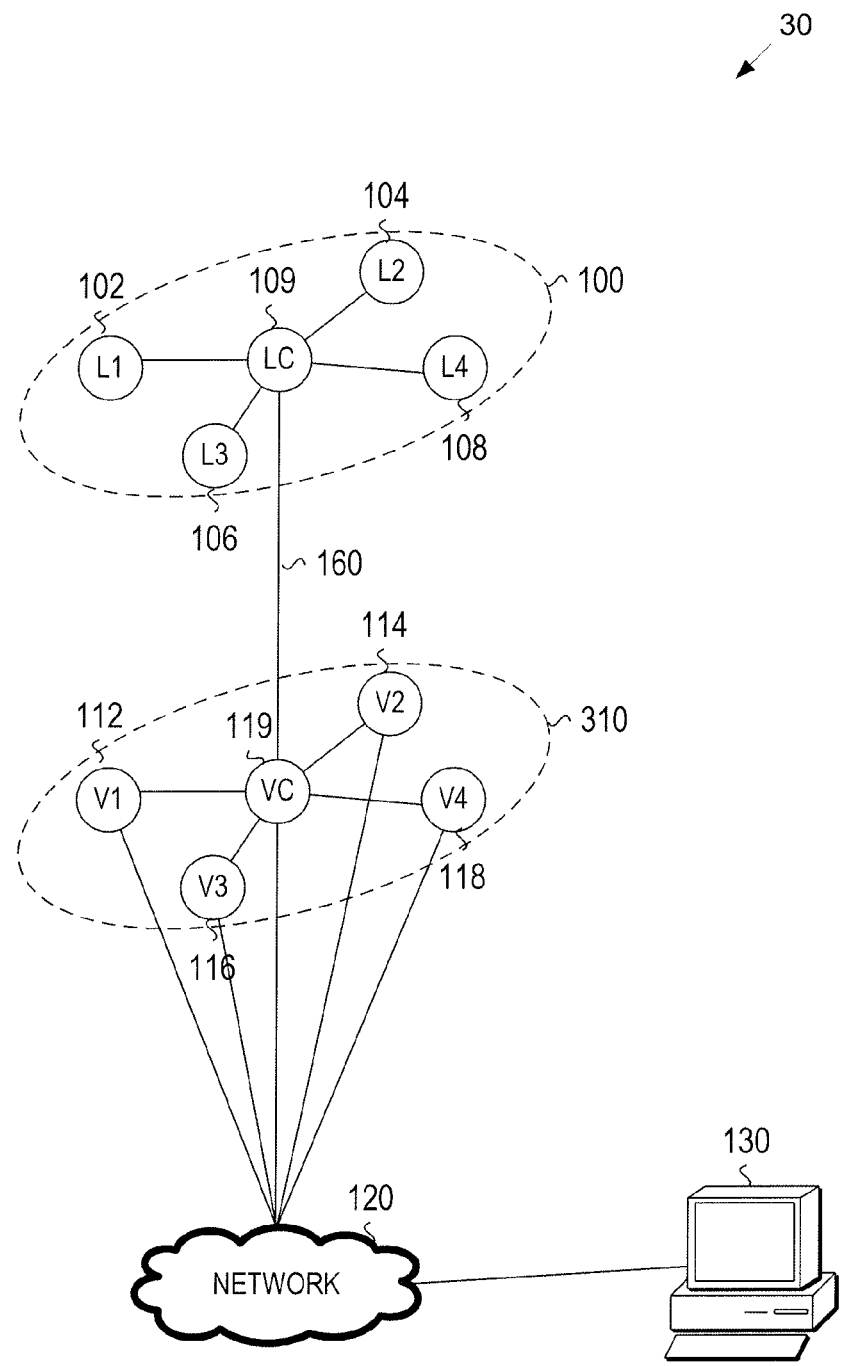
FIG. 10 is a system diagram illustrating an example of an alternate configuration of a virtual networking system.

FIG. 10 is a system diagram illustrating an example of an alternate configuration of a virtual networking system, in accordance with at least some embodiments of the present disclosure. As illustrated in FIG. 10, in some embodiments, a virtual networking system 30 may be configured to provide direct network connectivity to each virtual device in the virtual device computing system 310. In the example of FIG. 10, virtual devices 112, 114, 116, and 118 and the virtual device coordinator 119 may each be directly connected to network 120. The computing device 130, via the network 120, may be adapted to directly connect to any virtual device 112, 114, 116, or 118 in the virtual device computing system 310 via an address associated with the corresponding device. For example, each virtual device may be addressed by a uniform resource locator (URL) or IP address.

Figure 11:
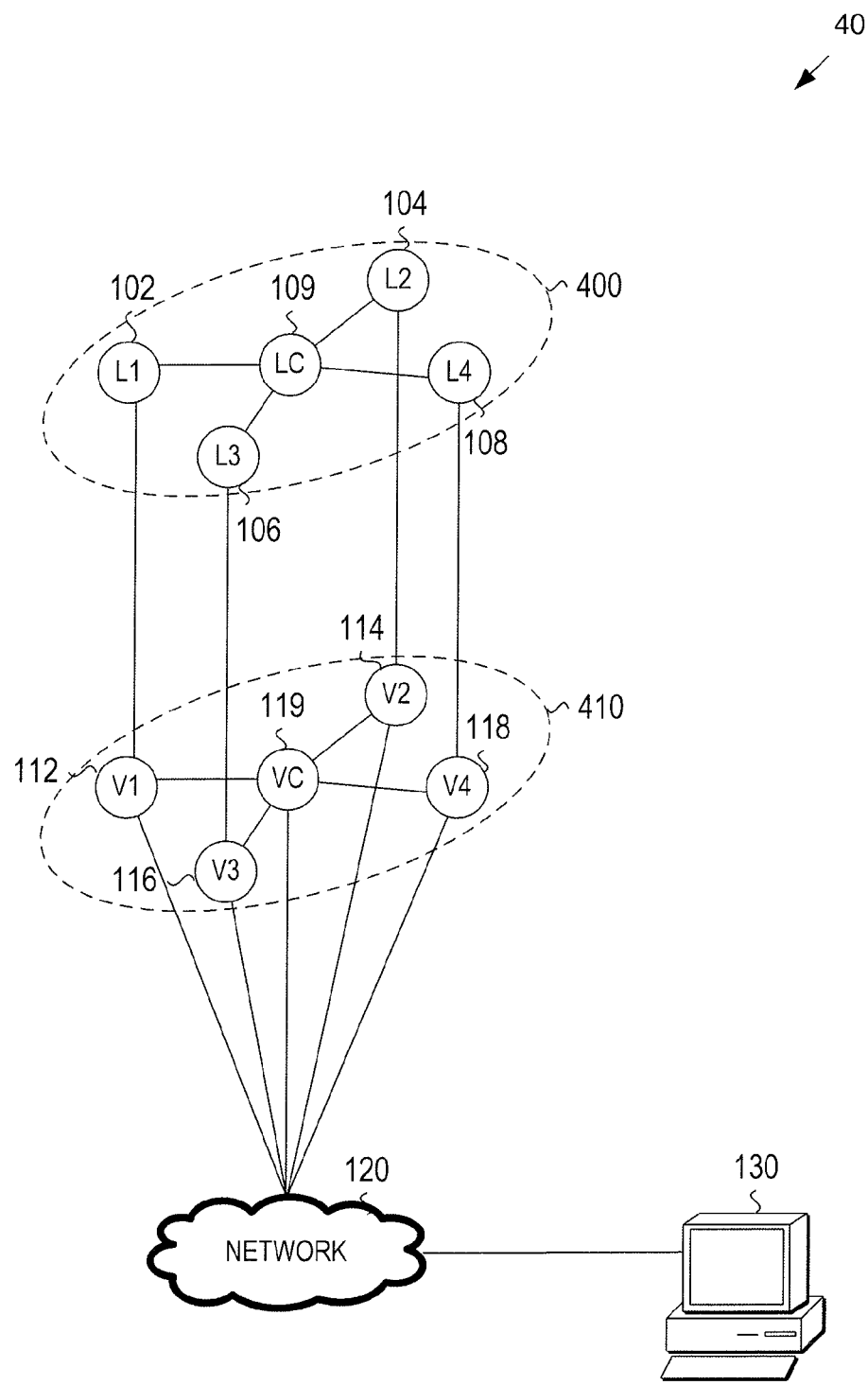
FIG. 11 is a system diagram illustrating an example of an alternate configuration of a virtual networking system.

FIG. 11 is a system diagram illustrating an example of an alternate configuration of a virtual networking system, in accordance with at least some embodiments of the present disclosure. As illustrated in FIG. 11, in some embodiments, a virtual networking system 40 may provide a virtual device computing system that is configured so that virtual devices directly contact their associated LP devices. In FIG. 11, virtual devices 112, 114, 116, and 118 in the virtual device computing system 410 may be directly coupled with their associated LP devices 102, 104, 106, and 108 in the LP device computing system 400. Thus, virtual devices 112, 114, 116, and 118 may be configured to directly communicate to associated LP devices 102, 104, 106, and 108 without use of the LP device coordinator 109 and the virtual device coordinator 119. It should be understood, however that the virtual device coordinator 119 nonetheless may still provide services such as virtual device creation, virtual device configuration, and maintenance of virtual computing system 410.

Figure 12:
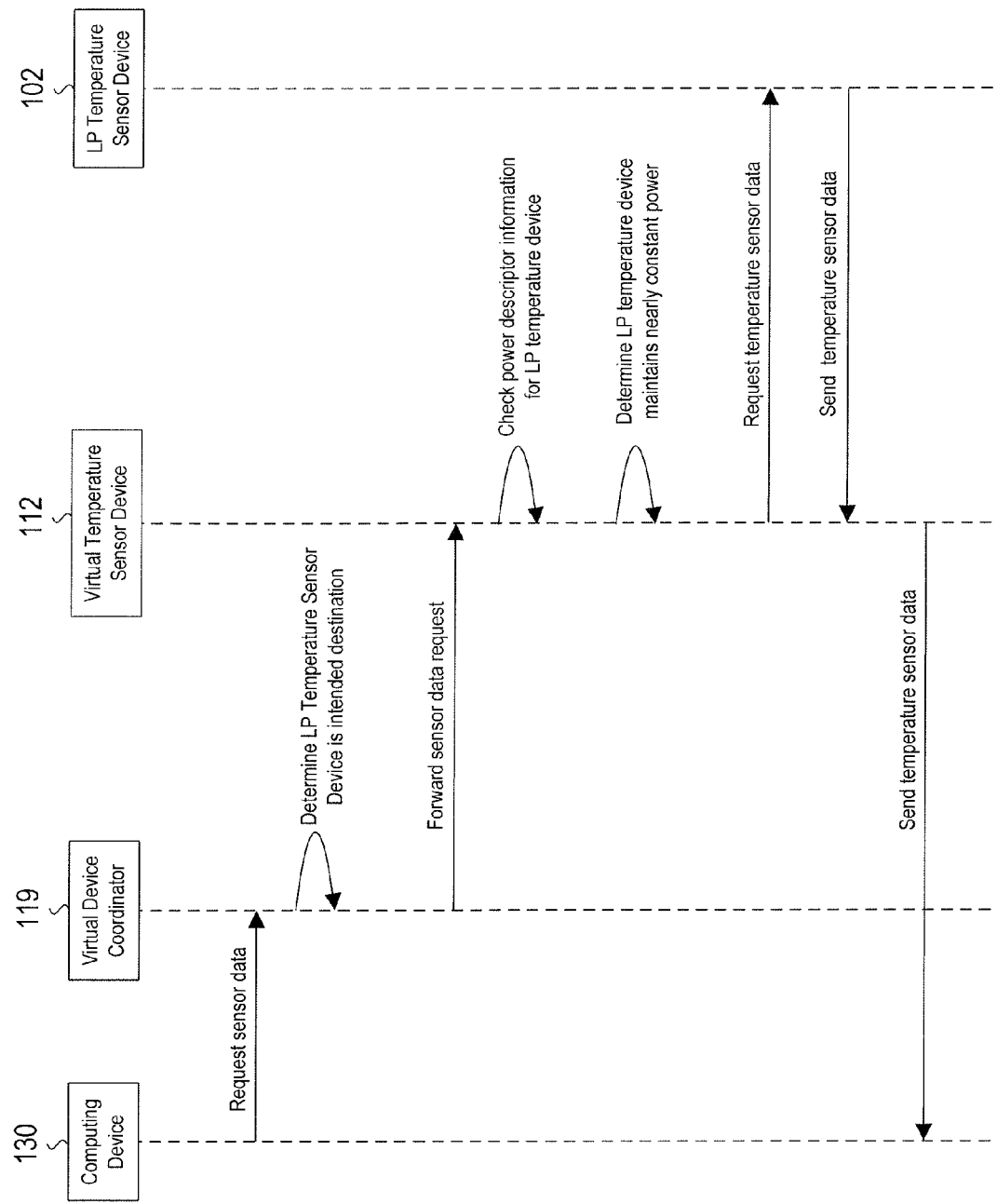
FIG. 12 is a sequence diagram illustrating an example process of using a virtual device to handle requests for an LP device wherein the LP device maintains nearly constant power.

FIG. 12 is a sequence diagram illustrating an example process of using a virtual device to handle requests for an LP device wherein the LP device maintains nearly constant power, in accordance with at least some embodiments of the present disclosure. In this regard, the virtual device computing system 110 may serve as an intermediary for communication between computing devices (e.g., the computing device 130 of FIG. 2) and the LP device computing system 100. In the example of FIG. 12, a computing device 130 may be arranged to send a request for temperature sensor data to the virtual device coordinator 119. The virtual device coordinator 119 may be configured to determine the intended destination of the sensor data request. In some embodiments, the virtual device coordinator 119 may be arranged to evaluate a destination address associated with the sensor data request. This destination address may be, for example, a uniform resource locator (URL) or IP address. Once the virtual device coordinator 119 determines that an LP temperature sensor device 102 is the intended destination, the sensor data request may be forwarded to a virtual temperature sensor device 112 associated with the requested LP device 102. The virtual temperature sensor device 102 may check the power descriptor information associated with the LP device 102. If the virtual temperature sensor device 112 determines, for example, that the underlying LP device 102 operates under nearly constant power, the request for temperature sensor data may be sent to the LP device 102. The LP device 102 may reply to the computing device 130 via the virtual temperature sensor device 100.

Figure 13:
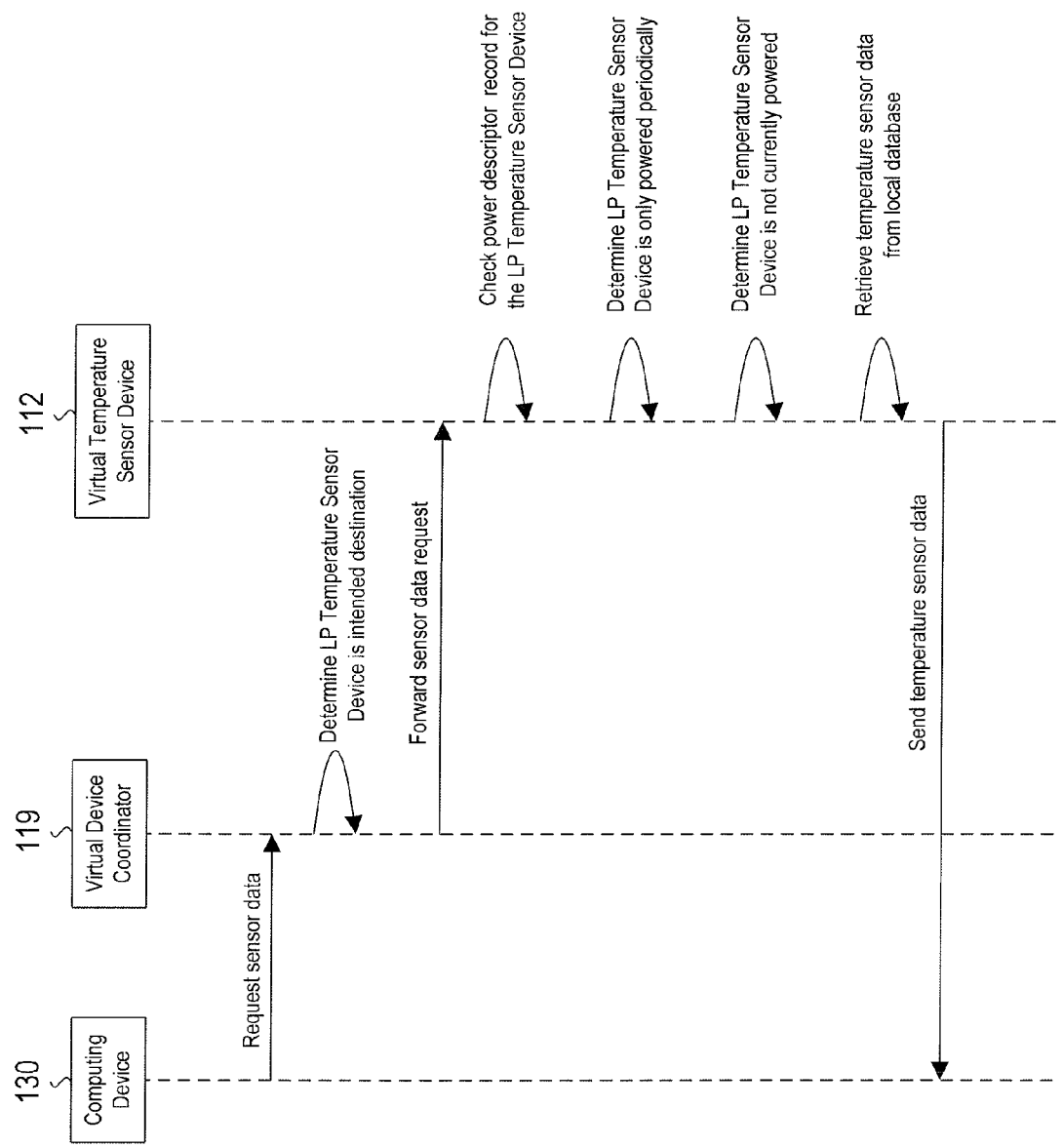
FIG. 13 is a sequence diagram illustrating an example process of using a virtual device to handle requests for an LP device wherein the LP device is powered periodically.

FIG. 13 is a sequence diagram illustrating an example process of using a virtual device 112 to handle requests for an LP device wherein the LP device is powered periodically, in accordance with at least some embodiments of the present disclosure. In FIG. 13, the virtual temperature sensor device 112 may be adapted to examine the power characteristics of the LP temperature sensor device 102 (not shown in FIG. 13). These power characteristics may have been determined, for example, based on information included in one or more descriptor files that were previously received by the virtual temperature sensor device 112. In FIG. 13, the virtual temperature sensor device 112 may be arranged to determine that the LP device 102 is powered periodically. The virtual temperature sensor device 112 may interrogate a database (not shown) coupled to the virtual temperature sensor device 112 to see when device 112 last received data from the LP device 102. Finding the data to be sufficiently recent, the virtual temperature sensor device 112 may respond to the computing device 130 on behalf of LP temperature sensor device 102. If the virtual temperature sensor device 112 determines that the data was not sufficiently recent, the device 112 may then request the data from the LP device 102 and may respond as in the example of FIG. 12.

Figure 14:
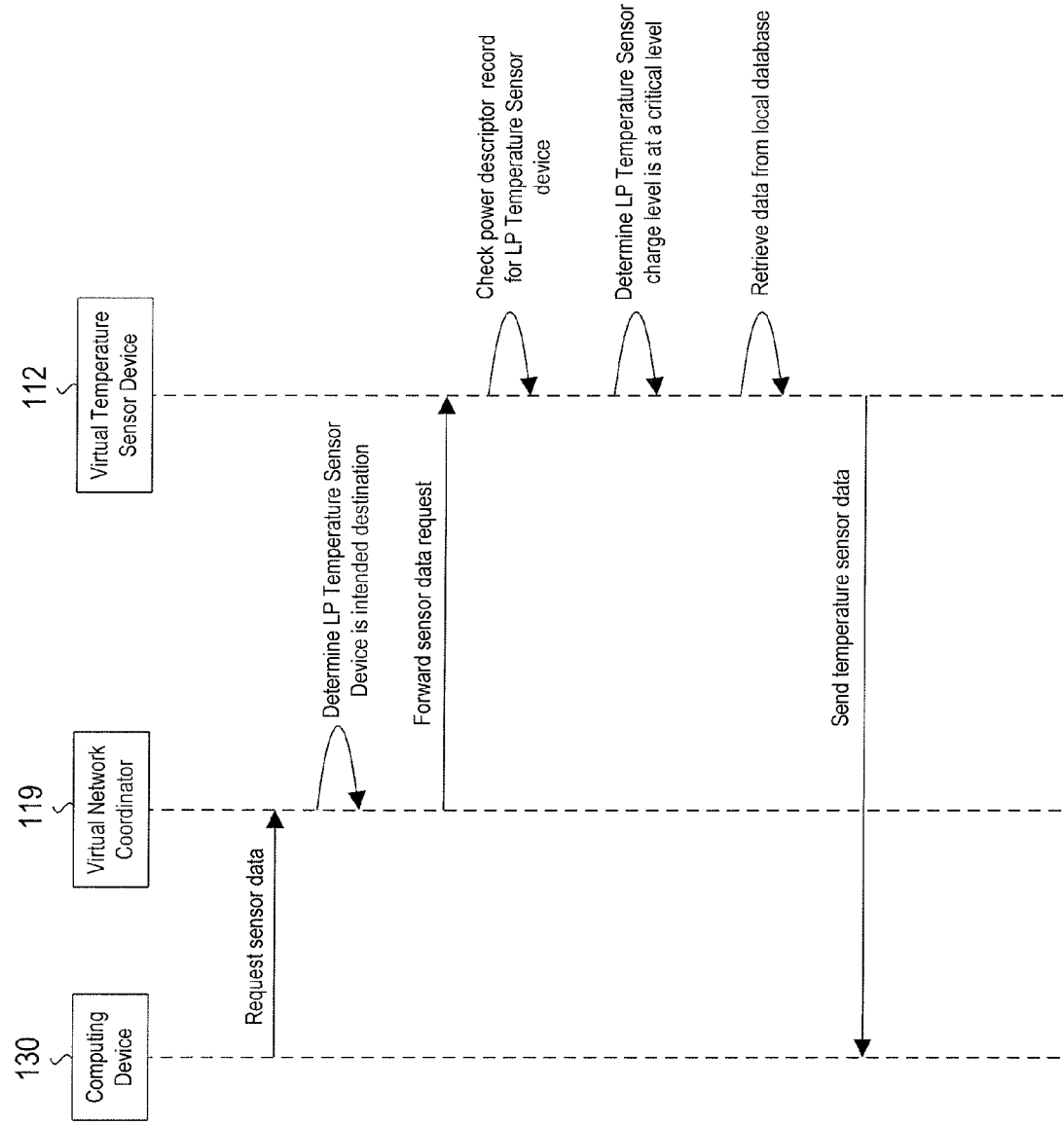
FIG. 14 is a sequence diagram illustrating an example process of using a virtual device to handle requests for an LP device wherein the charge level of the LP device is at a critical level.

FIG. 14 is a sequence diagram illustrating an example process of using a virtual device 112 to handle requests for an LP device 102 wherein the charge level of the LP device 102 is at a critical level, in accordance with at least some embodiments of the present disclosure. Information regarding the charge level of the LP device 102 may be provided in, for example, a device descriptor file that is accessible to the virtual device 112. In the example of FIG. 14, the virtual temperature sensor device 112 may be arranged to respond with information from the database (not shown), regardless of how recently the data was updated. A similar response may be generated when the virtual temperature sensor device 112 determines that the LP device 102 is in a power off state. In some embodiments, the virtual temperature sensor device 100 may be configured to send information to the requesting computing device 130 to indicate that the information may be out of date and possibly inaccurate.

In some embodiments, the virtual device computing system 110 may be adapted to enhance the functionality of the underlying LP device computing system 100 by allowing one or more virtual devices 112, 114, 116, 118, and/or 119 to perform services on behalf of LP devices 102, 104, 106, 108, and/or 109. For example, a computing device 130 may be configured to interact with a virtual device directly or through a virtual device coordinator 119 to communicate a service request. A service request may include any information necessary to request a service on the virtual device. For example, a service request may comprise a request for low-power application data and a processing request. Examples of processing requests include, without limitation, requests for historical low-power device data, predicted future LP device data, and a request for a graphical display of low-power device data. For example, predicted future LP device data may be generated using, without limitation, nearest neighbor, linear, polynomial, or spline interpolation techniques. After a virtual device receives a service request, the virtual device may evaluate a descriptor file associated with the requested low-power device to determine whether the low-power device can provide the request service. If the requested low-power device cannot perform the requested service, the virtual device may perform the service locally, possibly using data previously generated by the low-power device.

Figure 15:
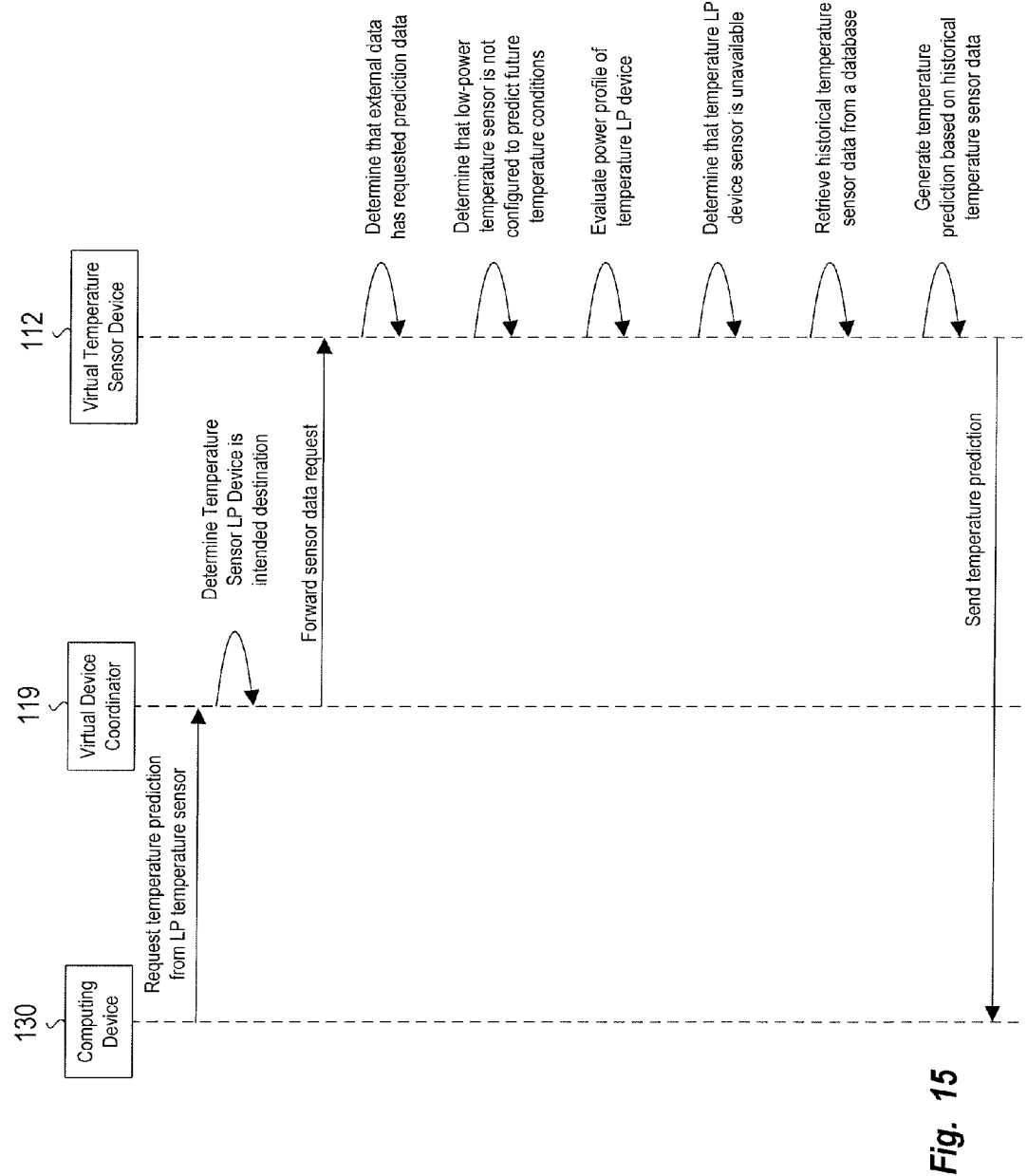
FIG. 15 is a sequence diagram illustrating an example process for using a virtual device to generate a temperature prediction, wherein an associated LP device is not available for communication.

FIG. 15 is a sequence diagram illustrating an example process for using a virtual device 112 to generate a temperature prediction, wherein an associated LP device is not available for communication, in accordance with at least some embodiments of the present disclosure. In this example process, a computing device 130 may attempt to retrieve a temperature prediction from an LP temperature sensor device 102 (not shown in FIG. 15). The computing device 130 may be adapted to send a service request for the temperature prediction to a virtual device coordinator 119. The virtual device coordinator 119 may be configured to analyze the destination information encoded in the service request and determine that the LP temperature sensor device 102 is the intended destination. The virtual device coordinator 119 may also be configured to forward the request to the virtual device associated with the LP temperature sensor device 102, i.e., virtual temperature sensor device 112. It should be noted that in other embodiments the computing device may be configured to contact the virtual temperature sensor device 112 directly, thereby bypassing the virtual device coordinator 119.

Still referring to FIG. 15, once the virtual temperature sensor device 112 receives the service request in FIG. 15, it may process the request. The temperature sensor device 112 may be arranged to determine that prediction data is requested. In some embodiments, this determination may be made by considering a processing request encoded in the received message. This processing request may, for example, include information to inform the virtual device 112 how to format the data for the requesting device. Examples of processing requests may include, without limitation, requests for historical low-power device data, predicted further low-power device data, and/or a request for a graphical display of low-power device data. The virtual device 112 may be adapted to evaluate the functional capabilities of the LP temperature sensor device 102 to determine whether the device 102 is capable of responding to the computing device's 130 sensor data request. In the example of FIG. 15, the virtual temperature sensor device 112 may determines that the LP temperature sensor device 102 is not configured to predict future temperature conditions. Thus, the virtual temperature sensor device 112 may either generate the requested temperature prediction internally or respond with an indication that the requested prediction is unavailable.

Still referring to FIG. 15, to increase the accuracy of the temperature prediction, the virtual temperature sensor device 112 may be configured to gather current temperature data from the LP temperature sensor device 102 if the LP temperature sensor device 102 is currently powered and available for communication (i.e., it is "active"). The virtual temperature sensor device 112 may be configured to determine whether the LP temperature sensor device 102 is active by evaluating a power profile derived from descriptor files provided by the LP device 102. If the power profile indicates that the LP device 102 is currently unavailable for communication, then it may not issue a query to the LP device 102. Unavailability may be indicated, for example, when the power profile specifies that the LP device is currently not powered. Similarly, when the power profile indicates that the LP device 102 is running on critical power, the virtual temperature sensor device 112 may not query the LP device 102 so that LP battery resources may be conserved. In the example of FIG. 15, the virtual temperature sensor device 112 determines that the LP device 102 is unavailable and a prediction is generated using only the historical data stored in a database accessible to the virtual temperature sensor device 112. Once temperature prediction is generated, the virtual temperature sensor device 112 may send the temperature prediction information to the computing device 130 as a reply to the original temperature prediction request.

If the LP device 102 is available while the temperature prediction is being generated, the virtual temperature sensor device 112 may gather current temperature data from the LP temperature sensor device 102 and include that data in the temperature prediction.

Figure 16:
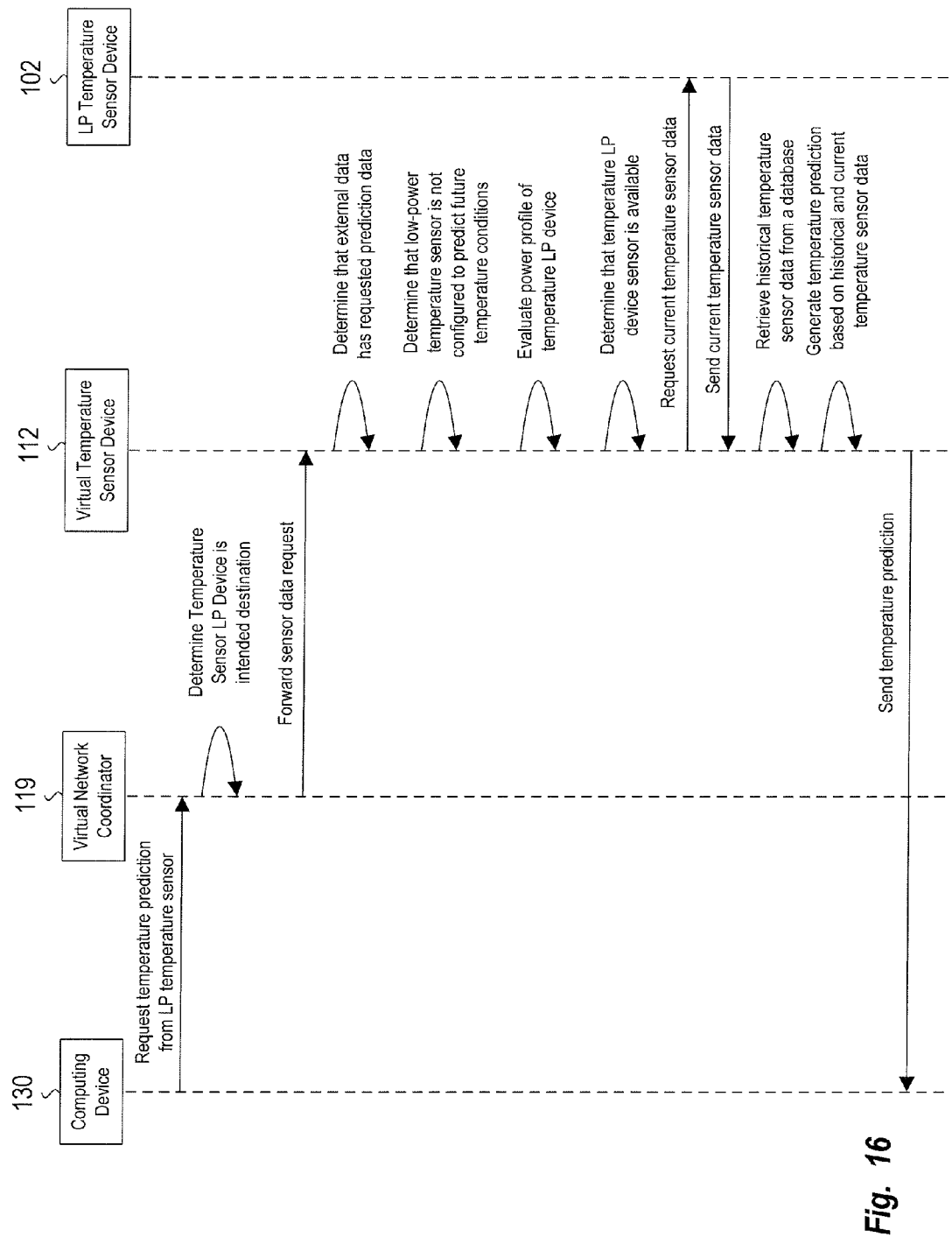
FIG. 16 is a sequence diagram illustrating an example process for using a virtual device to generate a temperature prediction, wherein an associated LP device is available for communication.

FIG. 16 is a sequence diagram illustrating an example process for using a virtual device 112 to generate a temperature prediction, wherein an associated LP device is available for communication, in accordance with at least some embodiments of the present disclosure. In the example of FIG. 16, the virtual temperature sensor device 112 evaluates the power profile associated with the LP device 102 and determines that the LP device 102 is available. Availability may be indicated, for example, when the power profile specifies that the LP device 102 is always powered on. The virtual temperature sensor device 112 may send a request for sensor data to the LP device 102 and may receive the associated response. Note that the request and response may be sent directly or through one or more intermediary virtual or LP devices. Similar to the example of FIG. 16, historical temperature data may be gathered from a database accessible to the virtual temperature sensor device 112. Using both historical and current temperature sensor data, a prediction may be generated. The prediction information may be sent to the computing device 130 as a response to the original temperature prediction request.

Figure 17:
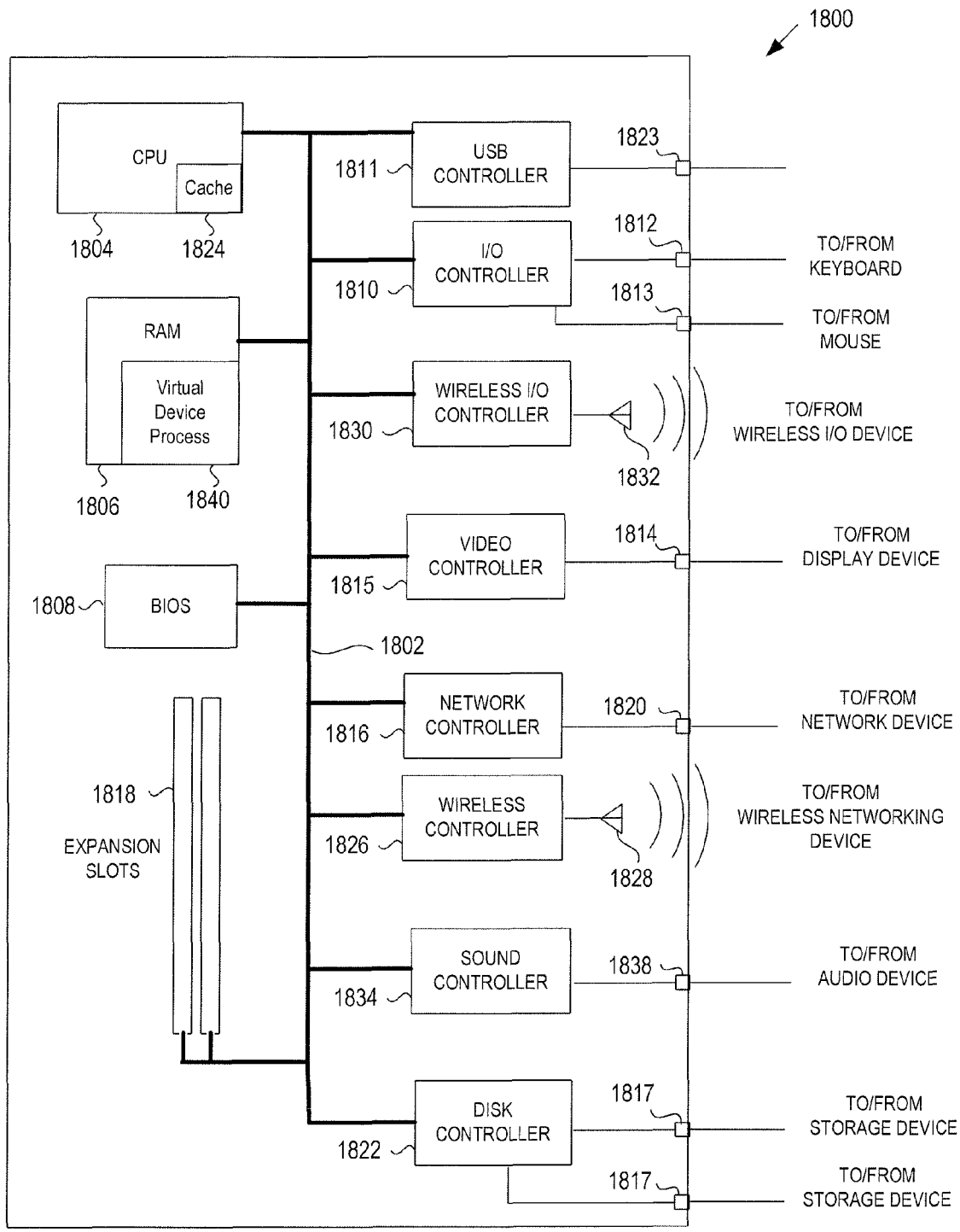
FIG. 17 is a block diagram illustrating a computer architecture or system illustrating an implementation of a virtual networking system; all arranged in accordance with at least some embodiments of the present disclosure.
Figure 3:
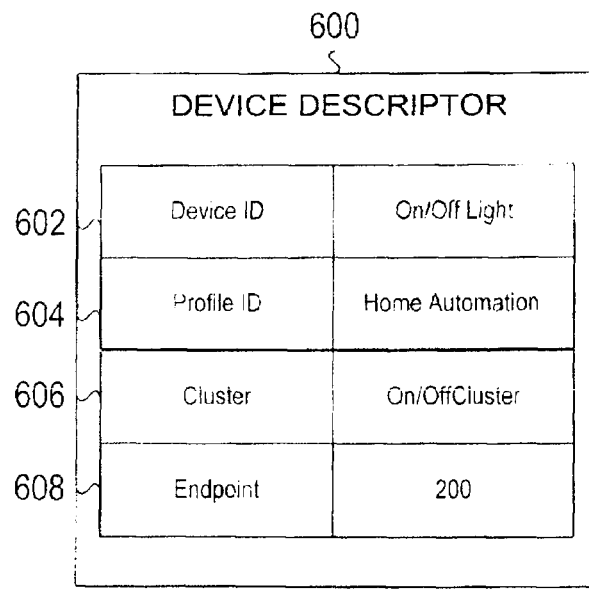

FIG. 17 is a block diagram illustrating a computer architecture or system 1800 illustrating an implementation of a virtual networking system 10, in accordance with at least some embodiments of the present disclosure. A system bus 1802 may be arranged to transport data amongst the Central Processing Unit (CPU) 1804, RAM 1806, the Basic Input Output System (BIOS) 1808 and other components. The CPU 1804 may include a cache memory component 1824. The RAM 1806 may include a virtual device process 1840. The virtual device process 1840 may be configured to support, emulate, and/or supplement the functionality of one or more LP device. The computer system 1800 may include one or more external storage ports 1817 for accessing a hard disk drive (HDD), optical storage drive (e.g., CD-ROM, DVD-ROM, DVD-RW), flash memory, tape device, or other storage device (not shown). The relevant storage device(s) may be connected or coupled through the external storage port 1817, which may be connected or coupled to the system bus 1802 via a disk controller 1822. A keyboard and pointing device (e.g. mouse. touch pad) (not shown) can be connected or coupled to the keyboard/mouse port(s) 1812, and other I/O devices could be connected or coupled to additional I/O port(s) 1813, which may be connected or coupled to the system bus 1802 through the I/O controller 1810. Additional ports or devices, such as serial ports, parallel ports, firewire adapters, or biometric devices (not shown), may be utilized through the I/O controller 1810. A display device (not shown) can be connected or coupled to a display device port 1814, which may be connected or coupled to the system bus 1802 through the video controller 1815. A network device (not shown), including but not limited to an Ethernet device or other device having networking capability, can be connected or coupled to a network port 1820, which may be connected or coupled through the network controller 1816 to the system bus 1802. The computer system 1800 may be wirelessly connected or coupled to a network device that may be configured for wireless operation (not shown), including but not limited to wireless routers, using an antenna 1828 connected or coupled to a wireless controller 1826, which may be connected or coupled to the system bus 1802, where the antenna may be arranged to transmit/receive signals to/from the network device. The computer system 1800 may include one or more USB ports 1823. A USB device (not shown), including but not limited to a printer, scanner, keyboard, mouse, digital camera, storage device, PDA, cellular phone, biometric device, webcam, and I/O adapters can be connected or coupled to the USB port 1823, which may be connected or coupled to the system bus 1802 through the USB controller 1811. Other devices, such as cellular phones, PDAs, and other portable devices may also be connected wirelessly via a wireless I/O antenna 1832 that is connected or coupled to a wireless I/O controller 1830. Examples of wireless I/O technologies include, but are not limited to, Bluetooth, Infrared (IR), and Radio-Frequency (RF). Audio devices, such as microphones, speakers, or headphones may be connected or coupled to a sound port 1838 that may be connected or coupled to a sound controller 1834 that may be connected or coupled to the system bus 1802. Expansion slots 1818 can be comprised of Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1800. These slots can be used to connect or coupled network cards, video cards, sound cards, modems and any other peripheral devices generally used with a computer. The computer system 1800 also includes a source of power (not shown), including but not limited to a power supply connected or coupled to an external source of power, and an internal or external battery. Detailed descriptions of these devices have been omitted for convenience only and should not be construed as limiting The embodiments of the present disclosure may be implemented with any combination of hardware and software. If implemented as a computer-implemented apparatus, the embodiment is implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the embodiments of the present disclosure. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method of using a virtual device to respond to a data request from a requesting device on behalf of a low-power device, wherein the data request is addressed to the low-power device and the virtual device executes in an operating system running in a virtual machine, the method comprising:
   receiving, by the virtual device, the data request from the requesting device, wherein the received data request comprises a request for application data and at least one processing instruction to be performed on the application data;
   determining, by the virtual device, that the processing instruction requires functionality that is not supported by the low-power device and that the virtual device is configured to respond to the received data request on behalf of the low-power device;
   retrieving, by the virtual device, low-power device data from a database when the virtual device determines that the virtual device is configured to respond to the received data request on behalf of the low-power device;
   selecting, by the virtual device, a virtual application configured to execute the at least one processing instruction in the operating system running in the virtual machine;
   generating, by the virtual device using the virtual application, a data response based on the retrieved low-power device data and the processing instruction; and
   sending, by the virtual device, the data response to the requesting device.

2. The method of claim 1, wherein the at least one processing instruction comprises one or more of a request for historical low-power device data and/or predictive future low-power device data.

3. The method of claim 1, wherein the at least one processing instruction comprises a request of a graphical display of low-power device data.

4. The method of claim 1, wherein the virtual device is an instance of an object-oriented class.

5. The method of claim 1, wherein the requesting device is one or more of a mobile phone, personal computer, navigation computer, and a video game system.

6. An article of manufacture for using a virtual device to respond to a data request from a requesting device on behalf of a low-power device, wherein the data request is addressed to the low-power device and the virtual device executes in an operating system running in a virtual machine, the article of manufacture comprising a non-transitory computer-readable medium holding computer-executable instructions for performing a method comprising:
   receiving, by the virtual device, the data request from the requesting device, wherein the received data request comprises a request for application data and at least one processing instruction to be performed on the application data;
   determining, by the virtual device, that the processing instruction requires functionality that is not supported by the low-power device and that the virtual device is configured to respond to the received data request on behalf of the low-power device;
   retrieving, by the virtual device, low-power device data from a database when the virtual device determines that the virtual device is configured to respond to the received data request on behalf of the low-power device;
   selecting, by the virtual device, a virtual application configured to execute the at least one processing instruction in the operating system running in the virtual machine;
   generating, by the virtual device using the virtual application, a data response based on the retrieved low-power device data and the processing instruction; and
   sending, by the virtual device, the data response to the requesting device.

7. The article of manufacture of claim 6, wherein the at least one processing instruction comprises one or more of a request for historical low-power device data and/or predictive future low-power device data.

8. The article of manufacture of claim 6, wherein the at least one processing instruction comprises a request of a graphical display of low-power device data.

9. The article of manufacture of claim 6, wherein the virtual device is an instance of an object-oriented class.

10. The article of manufacture of claim 6, wherein the requesting device is one or more of a mobile phone, personal computer, navigation computer, and a video game system.

11. A system for using a virtual device to respond to a data request from a requesting device on behalf of a low-power device, wherein the data request is addressed to the low-power device and the virtual device executes in an operating system running in a virtual machine, the system comprising:
   a network receiver configured to receive the data request from the requesting device, wherein the received data request comprises a request for application data and at least one processing instruction to be performed on the application data;
   a memory;
   a processor configured to
      determine that the processing instruction requires functionality that is not supported by the low-power device and that the virtual device is configured to respond to the received data request on behalf of the low-power device,
      retrieve at least one low-power device data item from the memory when the virtual device determines that the virtual device is configured to respond to the received data request on behalf of the low-power device,
      select a virtual application configured to execute the at least one processing instruction in the operating system running in the virtual machine, and
      generate, using the virtual application, a data response based on the retrieved low-power device data item and the processing instruction; and
   a network transmitter configured to send the data response to the requesting device.

12. The system of claim 11, wherein the at least one processing instruction comprises one or more of a request for historical low-power device data and/or predictive future low-power device data.

13. The system of claim 11, wherein the at least one processing instruction comprises a request of a graphical display of low-power device data.

14. The system of claim 11, wherein the virtual device is an instance of an object-oriented class.

15. The system of claim 11, wherein the requesting device is one or more of a mobile phone, personal computer, navigation computer, and a video game system.

* * * * *

UNITED STATES PATENT AND TRADEMARK OFFICE
CERTIFICATE OF CORRECTION

| | | |
|---|---|---|
| PATENT NO. | : 8,335,854 B2 | Page 1 of 2 |
| APPLICATION NO. | : 12/506391 | |
| DATED | : December 18, 2012 | |
| INVENTOR(S) | : Eldering | |

It is certified that error appears in the above-identified patent and that said Letters Patent is hereby corrected as shown below:

On the Title Page, Item (56), under "OTHER PUBLICATIONS", in Column 2, Line 2, delete "2010]" and insert -- 2010]. --, therefor.

On the Title Page, Item (56), under "OTHER PUBLICATIONS", in Column 2, Line 6, delete "[retreived" and insert -- [retrieved --, therefor.

On the Title Page, Item (56), under "OTHER PUBLICATIONS", in Column 2, Line 8, delete "pp. 76,245." and insert -- pp. 76, 245. --, therefor.

On Title Page 2, Item (56), under "OTHER PUBLICATIONS", in Column 1, Line 1, delete "et al," and insert -- et al., --, therefor.

On Title Page 2, Item (56), under "OTHER PUBLICATIONS", in Column 1, Line 2, delete "Automatino," and insert -- Automation, --, therefor.

In the Drawings:

Delete Drawing Sheet 3, and replace with Drawing Sheet 3. (attached)

Signed and Sealed this
Eighteenth Day of June, 2013

Teresa Stanek Rea
*Acting Director of the United States Patent and Trademark Office*